(12) United States Patent
Frank, Jr. et al.

(10) Patent No.: US 6,389,499 B1
(45) Date of Patent: May 14, 2002

(54) INTEGRATED COMPUTER MODULE

(75) Inventors: Charles W. Frank, Jr., Irvine; Thomas D. Hanan; Wally Szeremeta, both of Mission Viejo, all of CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/328,878

(22) Filed: Jun. 9, 1999

(51) Int. Cl.[7] .............................................. G06F 13/00
(52) U.S. Cl. ..................... 710/300; 710/301; 710/303; 710/304; 710/100; 361/685; 361/686
(58) Field of Search ................................ 361/685, 686, 361/727, 683, 695, 697, 707, 818; 710/100, 300, 301, 303, 304

(56) References Cited

U.S. PATENT DOCUMENTS

| | | | |
|---|---|---|---|
| 5,430,607 A | | 7/1995 | Smith |
| 5,627,974 A | | 5/1997 | Watter, Jr. et al. |
| 5,786,984 A | | 7/1998 | Bonardi et al. |
| 5,822,184 A | * | 10/1998 | Rabinovitz .................. 361/685 |
| 5,864,481 A | * | 1/1999 | Gross et al. ................. 364/400 |
| 5,896,273 A | * | 4/1999 | Varghese et al. ............ 361/724 |
| 6,327,152 B1 | * | 12/2001 | Saye ........................... 361/732 |

* cited by examiner

Primary Examiner—Rupal Dharia
(74) Attorney, Agent, or Firm—Milad G Shara

(57) ABSTRACT

The invention is an integrated computer module (ICM) for connection to a host connector means in a host assembly that has a DC voltage supply and that is connected to or contains a display. The ICM uniquely includes an EMI enclosure, a fan, a computing subsystem, and a module connector. In more detail, the computing subsystem includes a microprocessor, a hard disk drive for storing an operating system, a main memory array, a video memory array for storing digital display descriptor data in a video memory array; and a video controller for converting the digital display descriptor data to a time-based display data stream suitable for driving the display. The host connector, moreover, includes first conductors for coupling the time-based display data stream to the display via the host connector means; second conductors for receiving the DC voltage from the DC voltage supply in the host assembly via the host connector means to power the computing subsystem; and third conductors for exchanging data with an I/O device via the host connector means.

13 Claims, 21 Drawing Sheets

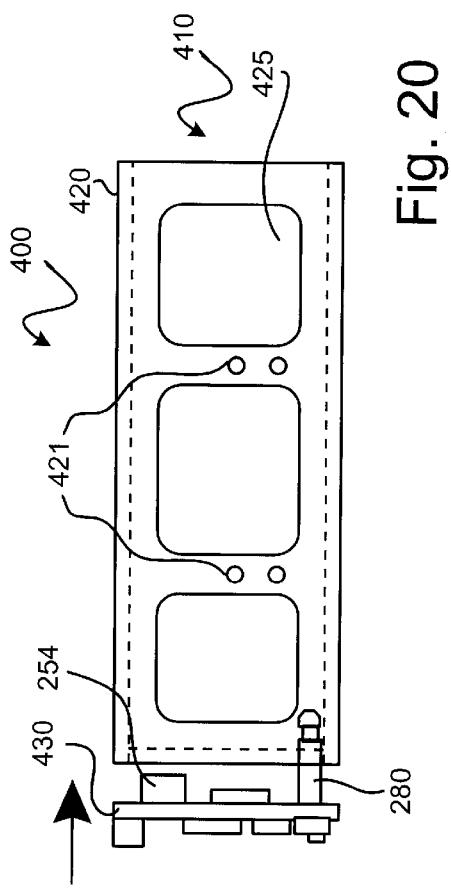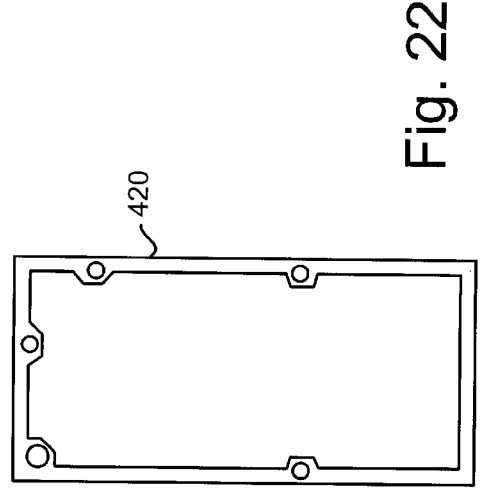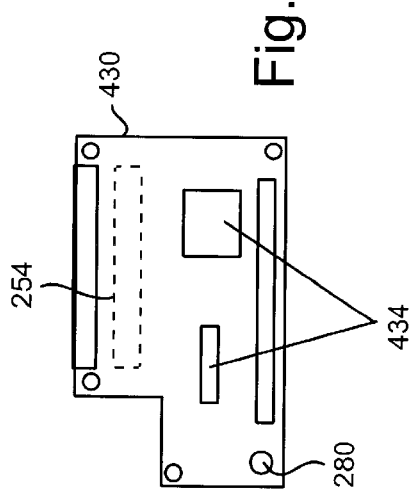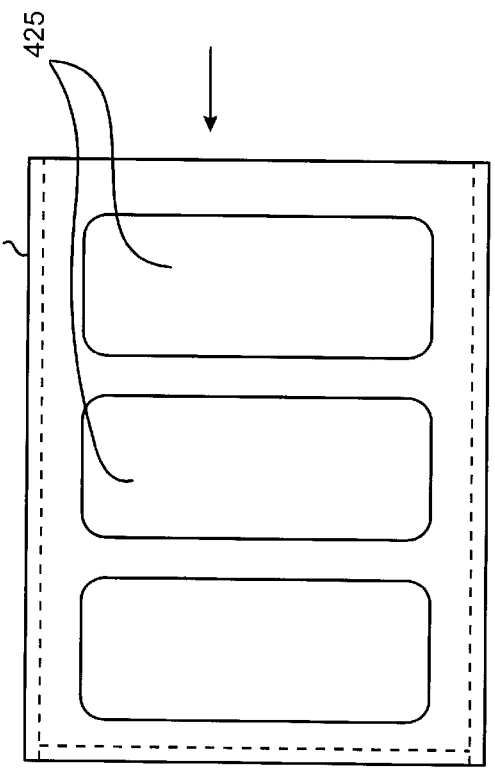
Fig. 19
Fig. 20
Fig. 21
Fig. 22
Front Opening

INTEGRATED COMPUTER MODULE

BACKGROUND OF THE INVENTION

1. Field of the Invention

The invention relates generally to integrated computer modules and, more specifically, to an integrated computer module that contains the computing system components that are most prone to obsolescence and often suitable for simultaneous replacement, including a CPU, main memory, a disk drive and a video controller.

2. Description of the Related Art

Today's personal computers (PC's) are usually sold in a desktop configuration or a notebook configuration. Desktop PC's are generally housed in a relatively large chassis containing a main printed circuit board or "motherboard" and other components that are incorporated into or connected to the motherboard. The components may be located inside or outside of the chassis. Typical internal components include a power supply, a central processing unit (CPU), random access memory (RAM), a mass storage device such as a magnetic disk drive, expansion cards connected to a bus on the motherboard, and various peripherals mounted on "rails" in "bays" within the chassis and electrically connected to the motherboard or an associated expansion card by a ribbon cable or the like. Typical expansion cards are a SCSI adapter, a sound adapter, and a network adapter. Typical bay-mounted peripherals are a magnetic disk drive, a floppy drive, a tape drive or a CD-ROM drive. Typical external "peripherals" include user input devices such as a keyboard, a mouse, a microphone, a joystick, a graphics tablet or a scanner and user output devices such as speakers a printer, and a video display device (e.g. a CRT display or an LCD display). The video adapter that controls the display, as with other adapters, may be integrated into the motherboard or provided on a separate expansion card.

The users of desktop PC's may be divided into two divergent groups: (1) experienced users who understand the individual components and tend to frequently upgrade their PC's by replacing such components, and (2) new users who do not understand or even want to understand the individual components. The latter group may prefer to replace the entire PC, if they upgrade at all. With respect to both groups, however, it has been observed that the need or desire to upgrade occurs far sooner with respect to some components than with respect to other components. In particular, users more frequently upgrade the CPU, the RAM, the magnetic disk drive, and the video adapter. These upgrades tend to provide more capacity and more speed because of rapid technological advancements on the part of manufacturers in response to ever-increasing demands from ever more complicated and more graphics intensive software applications and an associated increase in file sizes. Both user-types less frequently need or desire to upgrade the monitor, the speakers, the keyboard or the power supply, however, because these latter components have withstood the test of time and employ technologies that are less prone to obsolescence.

These inventors expect that the computer paradigm will move from a large chassis full of individual components of different manufacture toward a readily upgraded system consisting of two primary components: (1) an integrated computer module that compactly houses the frequently upgraded components (e.g. the CPU, the memory, the disk drive, and the video adapter) and provides a module connector for interfacing the module's electronics with peripherals, and (2) a "host assembly" with a docking bay that receives the module and provides a host connector that mates with the module connector. The host assembly can comprise any "shell" that includes the bay that receives the integrated computer module. The docking bay may be in a host assembly that doubles as a peripheral or in an intermediate assembly that is connected to conventional peripherals. The host assembly, for example, may function and appear generally like a conventional CRT display, save for the addition of the docking bay. A CRT-like host assembly of this nature would also provide a first connector for receiving input from a keyboard and, in all likelihood, a second connector for receiving input from a mouse. As another example, the host assembly may appear like a conventional tower chassis that contains a docking bay for receiving the module, and suitable electronics (e.g. a printed circuit board or PCB, cables, and so on) to interface the integrated computer module to conventional expansion cards via an expansion bus, and to conventional peripherals like a display, a keyboard, and a mouse, via connector ports built-in to the host assembly or carried by an expansion card.

There are a number of challenges associated with packing computer components and storage capability into a small integrated computer module. One such challenge is maintaining safe operating temperatures given a microprocessor and other components that dissipate relatively high levels of power. Another challenge for designing and building such modules is providing adequate shock protection for sensitive structures like disk drives. Still another challenge is providing an arrangement of components which allows for cost effective manufacturing processes. Yet another challenge is making sure the module is not abruptly removed from the host assembly during data-critical operations.

Computer modules and associated bays have already been proposed. For example, in U.S. Pat. No. 5,463,742 that issued in 1995 to Kobayashi, assigned to Hitachi, the inventor discloses a "personal processor module" (PPM) that fits within a notebook type docking station or a desktop type docking station, or simply attaches to a docking housing 6 that is cabled to a keyboard and a monitor. (See FIG. 1). As shown in FIG. 2, however, the '742 Patent discloses a PPM 2 which communicates with a docking station 3 via a pair of physical connectors 22, 24 that connect a local bus 20 in the PPM 2 with a local bus 33 in the docking station 3. As shown, therefore, the graphical adapter 48 is necessarily provided in the docking station 3 rather than the PPM 2.

As noted above, the user often needs or desires to upgrade the video controller at the same time that the user upgrades the CPU, the memory, and the disk drive. If the user of a PPM constructed according to the '742 patent upgraded to a newer PPM, however, the user would have to continue using the older graphical adapter 48, unless the user went to the trouble and inconvenience of separately updating the graphical adapter 48 or replacing the docking station 3 altogether.

There remains a need, therefore, for an integrated computer module that contains the computing subsystem components that are most prone to obsolescence and often suitable for simultaneous replacement.

SUMMARY OF THE INVENTION

In a first aspect, the invention may be regarded as an integrated computer module (ICM) for connection to a host connector means in a host assembly, the host assembly containing a DC power supply with DC voltage therefrom coupled to the host connector means, the host assembly connected to or containing a display, the ICM comprising: a computing subsystem operable solely when connected to the host assembly, the computing subsystem further comprising: a microprocessor; a hard disk drive for storing an operating system; means for supporting a main memory array; means for transferring at least a portion of the operating system to the main memory array; means for coupling the microprocessor to the main memory array for executing the operating system; means for storing digital display descriptor data in a video memory array; and a video controller for converting the digital display descriptor data to a time-based display data stream suitable for driving the display; module connector means for connecting to the host connector means, the module connector including first conductors for coupling the time-based display data stream to the display via the host connector means; second conductors for receiving the DC voltage from the DC voltage supply in the host assembly via the host connector means to power the computing subsystem; and third conductors for exchanging data with an I/O device via the host connector means; an EMI enclosure for containing emissions from the computing subsystem; and a fan powered by the DC voltage received via the host connector means for providing airflow to maintain the microprocessor within specified thermal limits.

BRIEF DESCRIPTION OF THE DRAWINGS

The just summarized invention may best be understood with reference to the Figures of which:

FIG. 19 is an elevational view of an adapter PCB for transforming a standard 5¼ peripheral bay of a conventional chassis into a docking bay according to this invention;

FIG. 20 is a side view of the adapter PCB of FIG. 19 and an associated adapter sleeve that is externally sized for insertion into a standard 5¼ drive bay and is internally sized for receiving an integrated computer module like the one shown in FIG. 1;

FIG. 21 is a top view of the adapter sleeve of FIG. 20;

FIG. 22 is a rear view of the adapter sleeve of FIG. 20; and

DETAILED DESCRIPTION OF THE PREFERRED EMBODIMENT

A. The Integrated Computer Module

A.1. Generally

Figure 1:
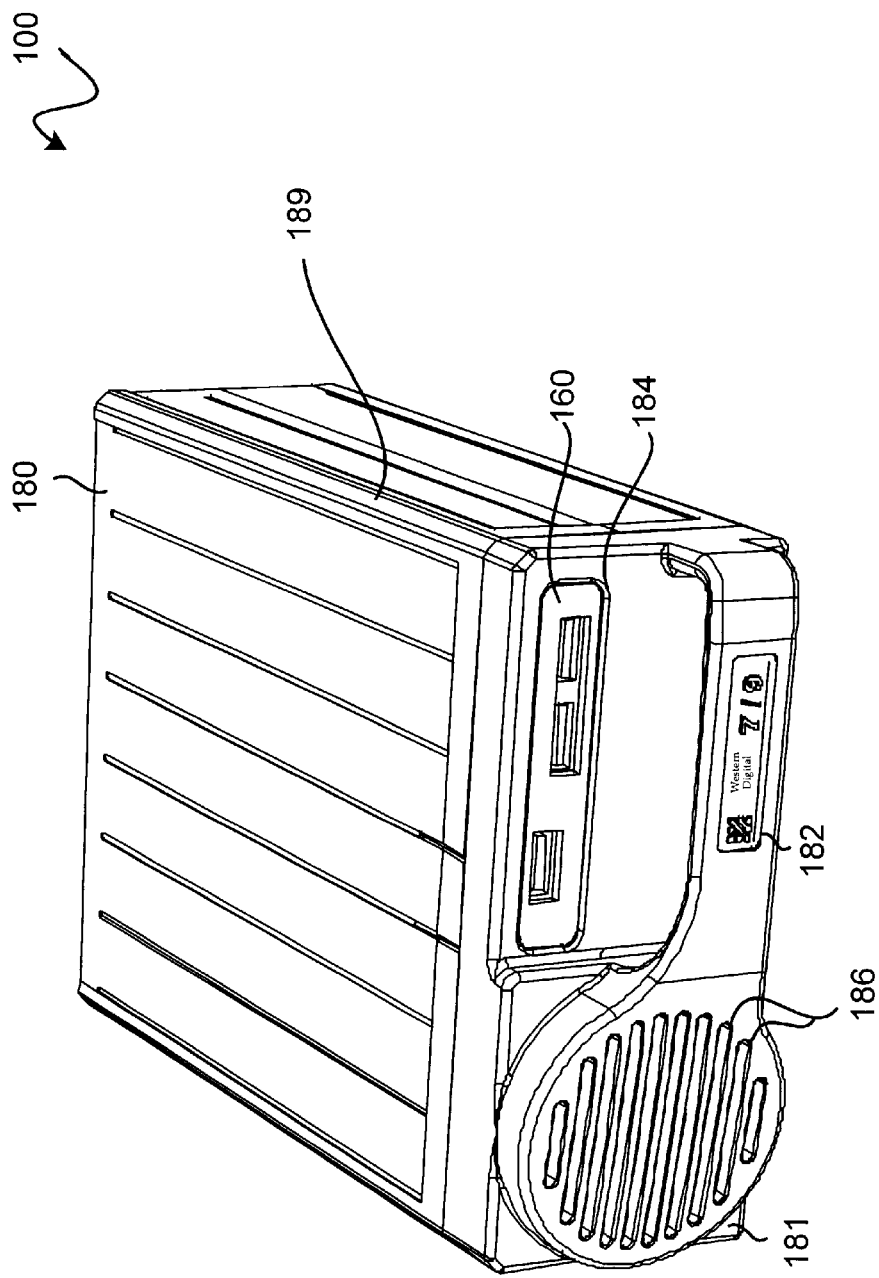
FIG. 1 is a perspective view of an integrated computer module (ICM) that may be used with a host assembly according to this invention.

FIG. 1 shows an integrated computer module (ICM) 100 that may be used in a host assembly having a docking bay according to this invention. From a structural point of view, the ICM 100 generally comprises a metal enclosure (not shown in FIG. 1, but see FIG. 4) that may be aesthetically surrounded by a case comprising, for example, a sleeve 180 and an associated bezel or faceplate 181. The preferred faceplate 181 includes cooling apertures 186 and a handle 182 for carrying the ICM 100 and for pushing or pulling the ICM 100 into or out of a docking bay (not shown in FIG. 1). The preferred sleeve 180 includes at least one key feature such as chamfered edge 189 that mates with a corresponding key feature in the docking bay. In the example shown, key feature 189 comprises a chamfered edge along one corner of the substantially rectangular periphery of the sleeve 180 which mates with a corresponding chamfered corner 389 (shown in FIGS. 15, 16) of the docking bay. The sleeve 180 and faceplate 181 are preferably injection molded components made of any suitable material such as ABS, PVC, or engineered plastics.

The preferred ICM 100 of FIG. 1 also includes an aperture 184 in the faceplate 181 for exposing an optional PCI Mezzanine (PCM) card 160 that provides additional functionality such as an ethernet port, a SCSI port, or other desired function. A blank PCM cover plate (not shown) may be located in the aperture 184 in the absence of a PCM card 160.

Figure 2:
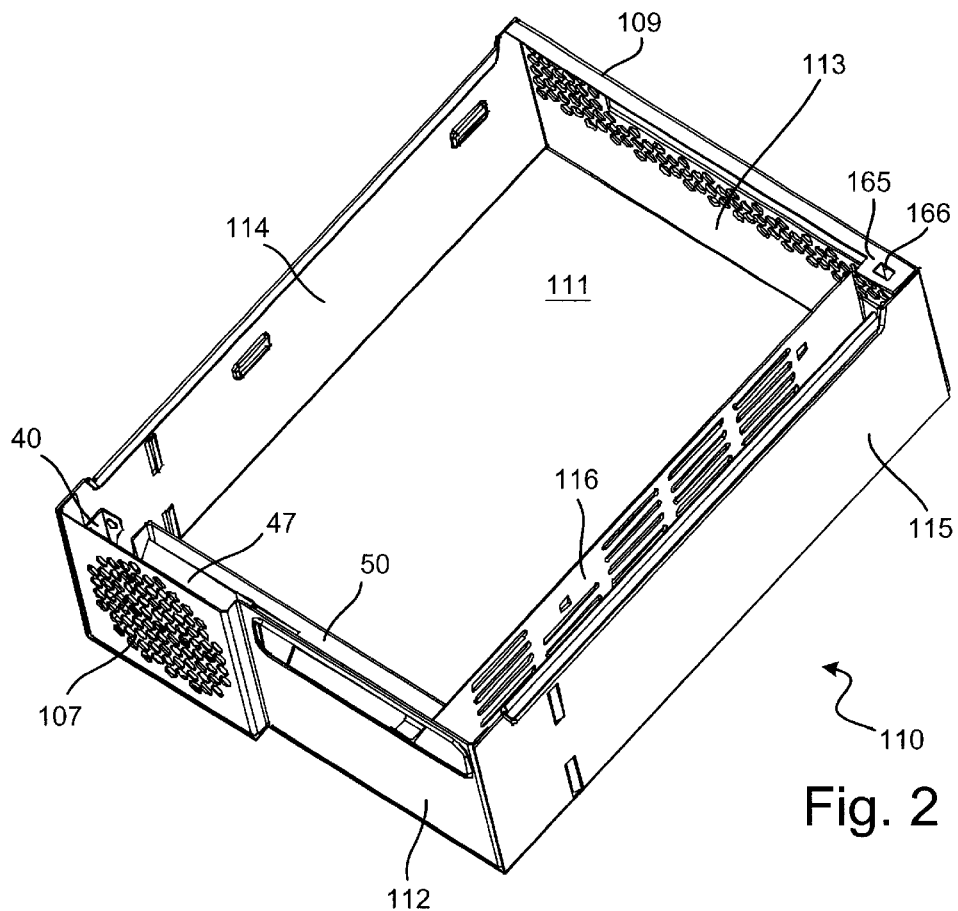
FIG. 2 is a perspective view of a chassis weldment that is formed as a open-top "tub" into which the components of the ICM are assembled.
Figure 3:
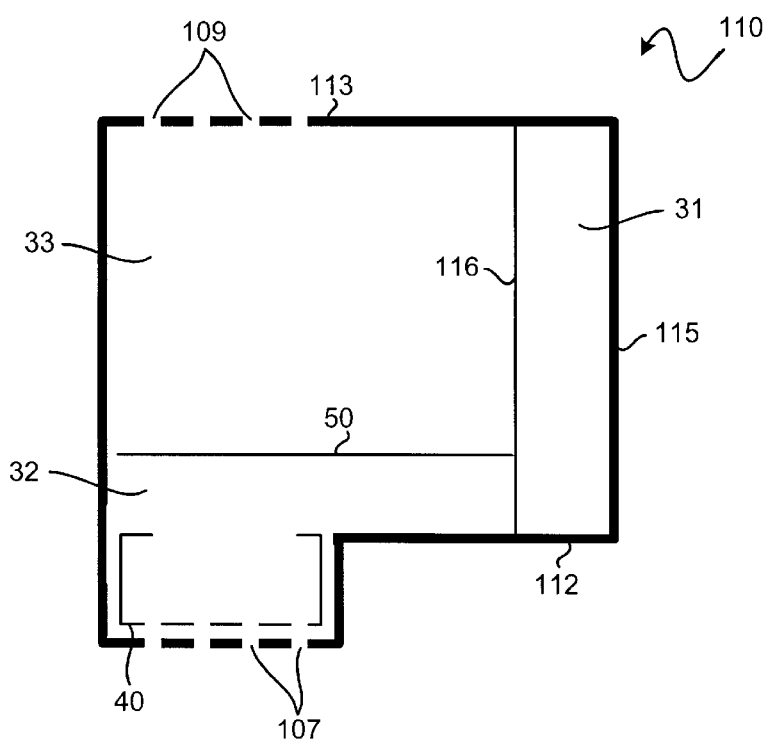
FIG. 3 is a top plan view of the tub of FIG. 2 showing how it is divided into sub-compartments, including a memory compartment 31, a cooling compartment 32, and a drive compartment 33.
Figure 4:
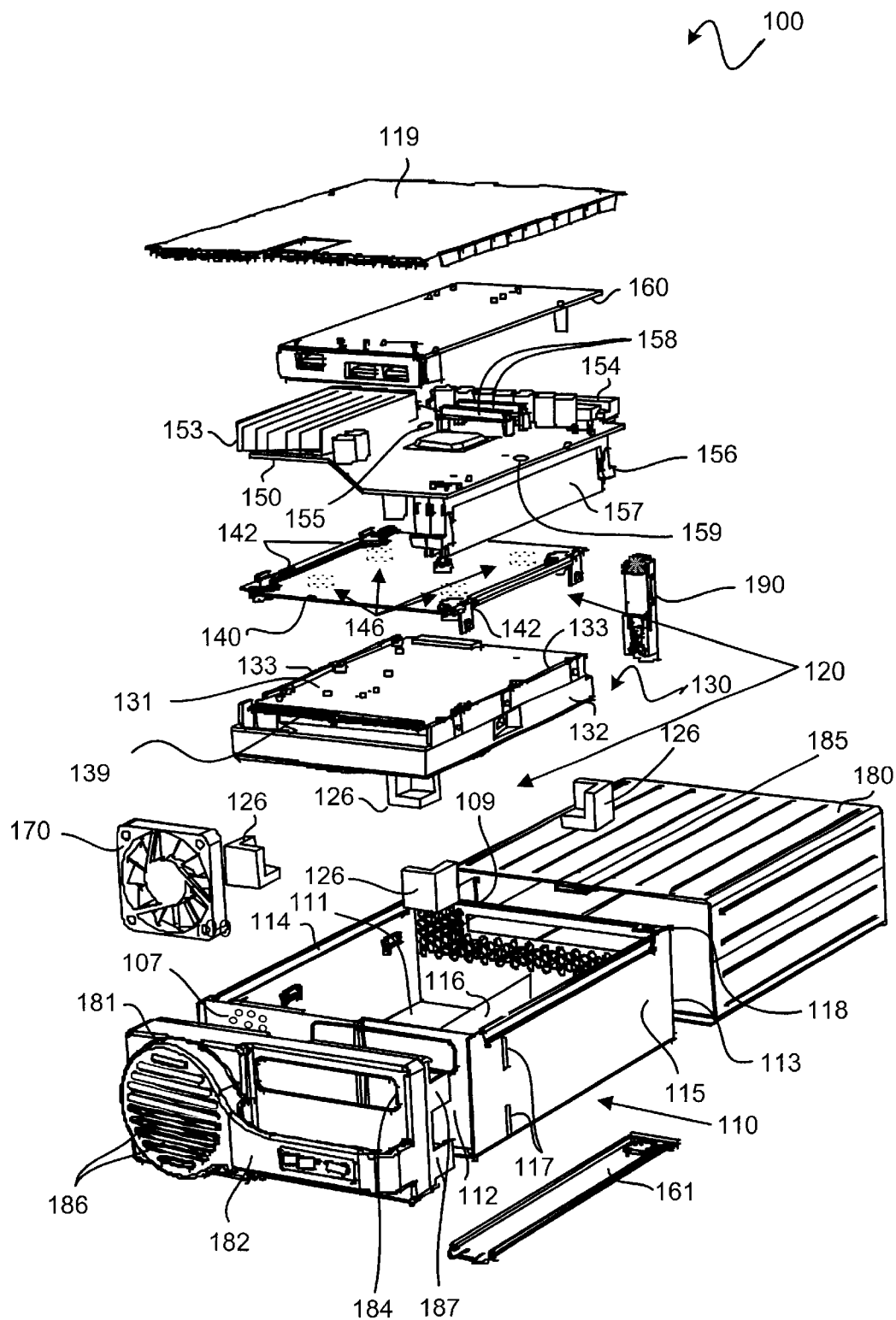
FIG. 4 is an exploded view of the integrated computer module of FIG. 1, showing the components which are assembled into the tub of FIG. 2.

Referring to FIGS. 2, 3 and 4, the construction of the preferred ICM 100 can be ascertained. FIG. 2 is a perspective view of a chassis weldment formed as an open-top "tub" 110 into which the components of the ICM 100 are assembled. FIG. 3 is a top plan view of the tub of FIG. 2 showing how it is divided into sub-compartments, including a memory compartment 31, a cooling compartment 32, and a drive compartment 33. Finally, FIG. 4 is an exploded view of the ICM 100, showing the presently preferred construction in more detail. As shown in FIG. 4 and discussed in more detail below, the ICM 100 is designed so that it can be assembled by hand or more efficiently, and more cost effectively assembled using automated assembly techniques. In particular, the components of the preferred ICM 100 are generally assembled, from above, into the open-top tub 110. The preferred ICM 100, in other words, is assembled in a successively stacked, layer by layer arrangement as suggested by the process flow charts of FIGS. 5 and 6. The tub 110 and all of the components inserted therein are ultimately covered with a ceiling wall 119 and then, if appropriate for the desired application, enclosed in the sleeve 180 and faceplate 181 that form the outer case shown in FIG. 1. The preferred ceiling wall 119 makes a snap-on connection to the tub 110 to speed assembly and eliminate the necessity for any threaded fasteners or the like.

Returning to FIGS. 2 and 4, the tub 110 has a floor wall 111, a front wall 112, a back wall 113 opposite the front wall, a first side wall 114, and a second side wall 115 opposite the first side wall. In order to define a space sized for receiving a disk drive 130, an intermediate side wall 116 is also provided between the first side wall 114 and the second side wall 115 and an intermediate front wall 50 is provided between the back wall 113 and the front wall 112. The tub 110 further includes a fan bracket 40 which receives a cooling fan, and a plurality of front and rear cooling apertures indicated at 107, 109 in the front and back walls respectively for passage of cooling air. A hold-down ramp 47 extends from the bottom of the fan bracket 40 for airflow reasons as discussed below. The tub 110 is designed to minimize leakage of electromagnetic interference (EMI) in accordance with FCC requirements. Accordingly, the tub 110 and associated ceiling wall 119 are metallic and the cooling apertures 107, 109 are sized and configured to meet the desired EMI requirements at the frequencies of interest.

The ICM's internal components generally include a shock mount system 120, a disk drive 130 that is supported in the shock mount system 120 and may have a controller PCBA 131 mounted on one side thereof, an intermediate plate 140, a main PCBA 150, and an optional PCM expansion card 160 as mentioned above. Preferably, the main PCBA 150 includes a microprocessor such as an Intel Pentium (not shown) located beneath a suitable heat sink 153, first and second memory module connectors 156 for holding memory modules 157 of a suitable type and desired capacity (e.g. Single Inline Memory Modules, or Dual Inline Memory Modules), and a module connector 154 for interfacing the overall ICM 100 to a host assembly. Collectively, the components mounted on the main PCBA 150 comprise substantially all the circuits needed for a computing subsystem.

As the ICM 100 contains volatile memory 157 and a disk drive 130, there could be a catastrophic loss of data if the ICM 100 were inadvertently removed before data stored in memory is saved to disk or during a write operation. As shown in FIG. 4, therefore, the preferred ICM 100 includes a locking mechanism 190 for preventing data corruption or loss due to a surprise removal of the ICM 100. The preferred locking mechanism 190 engages a projecting member 280 shown in FIG. 18 (discussed below) in the docking bay as discussed below. The preferred locking mechanism 190 mechanically snaps into a corner of the tub 110 between an upper slot 118 and a lower slot (not shown).

Returning to FIG. 5, taken in view of the structures discussed above, one can readily understand the preferred method of assembling an ICM 100. In particular, one can appreciate that the assembly process proceeds by successively depositing components into the tub 110 from above. This approach makes the ICM 100 especially practical to manufacture using automated assembly equipment, but efficiencies in hand assembly are also made possible. The first step 401 in assembling an ICM 100 according to this invention is providing a tub 110 having a floor wall 111, a front wall 112, a back wall 113 opposite the front wall, a first side wall 114, and a second side wall 115 opposite the first side wall. As defined here, the tub 110 may have one main compartment or may have a plurality of sub-compartment as shown in FIG. 3. The next step 402 is depositing a lower shock mount (e.g. corner pieces 126) into the tub 110 and onto the floor wall 111. At step 403, a disk drive 130 is deposited into the tub 110 with a lower side of the disk drive engaging the lower shock mount. In next step 404, an upper shock mount (e.g. buttons 146) is deposited into the tub 110 so as to engage an upper side of the disk drive 130, and at step 405 an intermediate plate 140 is deposited into the tub 110 and onto the upper shock mount. The upper shock mount may be pre-bonded to an under side of the intermediate plate 140 such that steps 404 and 405 occurs nearly simultaneously, but successively. In step 406, the intermediate plate 140 is secured above the disk drive (i.e. to the tub 110) to retain the disk drive within the tub 110 between the upper and lower shock mount assemblies. In step 407, the main PCBA 150 is assembled into the tub and onto the intermediate plate 140. Step 408 involves making an electrical connection between the main PCBA 150 and the disk drive 130. In step 408, the process proceeds in step 409 by locating a module connector, electrically connected to the main PCBA 150, at a desired location at the tub's back wall 113 to provide for connection with a host connector when the ICM 100 is inserted into a host assembly. Finally, the process proceeds to step 410 by depositing a ceiling wall 119 onto the tub 110 to define an enclosure that contains the shock mount assemblies, the disk drive, the intermediate plate, and the main PCBA.

Figure 5:
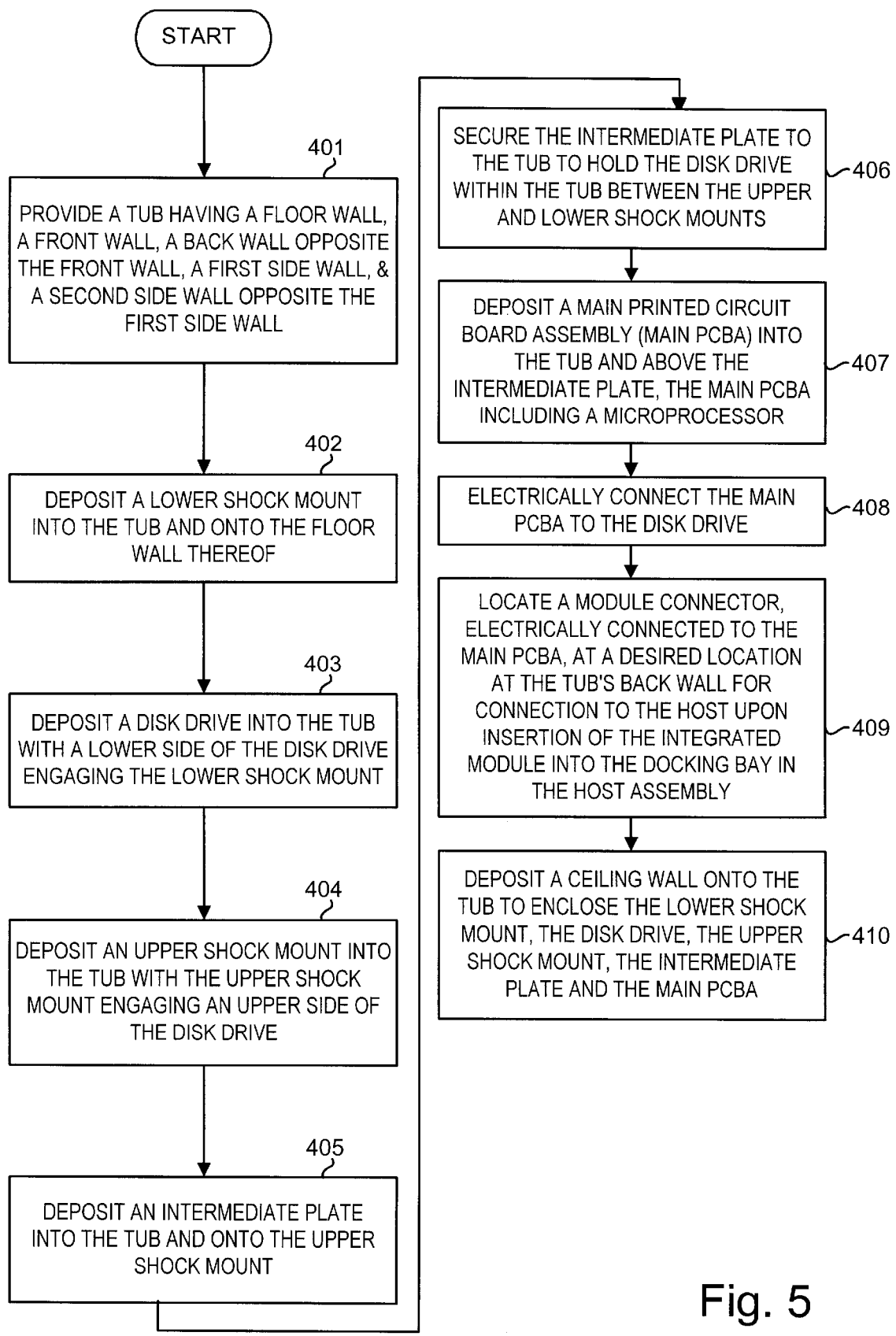
FIG. 5 is a flow chart setting forth the steps of a first method of assembling an integrated computer module beginning with a tub in general.
Figure 6:
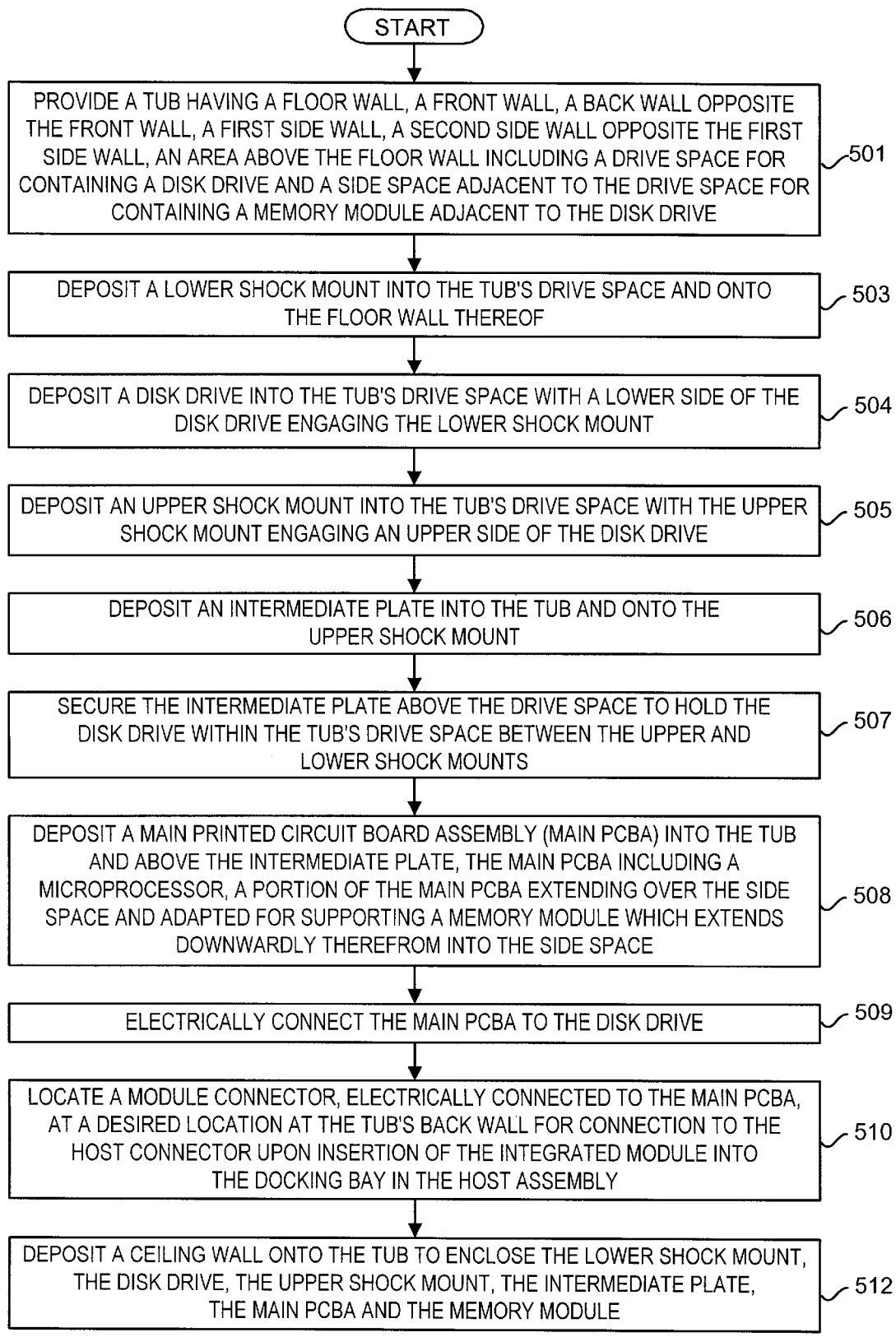
FIG. 6 is a flow chart setting forth the steps of a second method of assembling an integrated computer module beginning with the tub of FIG. 2.

FIG. 6 is directed to an assembly process that is similar to that illustrated by FIG. 5. Here, however, the process is directed specifically to a tub 110 having a plurality of sub-compartments 31, 32, 33 as shown in FIG. 3. The sub-compartments 31, 32, 33 are defined by providing an intermediate side wall 116 and an intermediate front wall 50 within the tub 110. The sub-compartments include a side compartment 31 which provides space for receiving the memory modules extending downwardly from an underside of the main PCBA (not shown, but see FIG. 4), and a drive compartment 33 for containing the disk drive 130. Also provided is a front compartment 32 which provides an area for accelerating cooling air from the fan over the main PCBA.

The assembly process of FIG. 6 comprises the steps of providing a tub 110, as defined before, but now recites an area above the floor wall which includes a drive space 33 for containing the disk drive 130 and a side space 31 for containing a memory module. A front space 32, as shown in FIG. 3, is also contemplated. The spaces 31, 32, 33 are preferably formed with intermediate walls 116, 60, but they may be less clearly bounded as through the use of small drive retention brackets or the like. The tub 110, as noted above, includes front and back cooling apertures 107, 109. It may be desirable, therefore, to include a fan bracket 40 adjacent the front cooling apertures 107 for conveniently receiving a fan 170 deposited from above. The assembly process of FIG. 6 comprises the further steps of depositing a lower shock mount (e.g. corner pieces 126) into the tub's drive space 33 and onto the floor wall 111 (step 503); depositing a disk drive 130 into the tub's drive space 33 with a lower side of the disk drive engaging the lower shock mount (step 504); depositing an upper shock mount (e.g. buttons 146) into the tub's drive space 33 so as to engage an upper side of the disk drive 130 (step 505); depositing an intermediate plate 140 into the tub 110 and onto the upper shock mount (step 506); securing the intermediate plate above the drive space to hold the disk drive 130 within the tub's drive space 33 between the upper and lower shock mounts (step 507); depositing a main PCBA 150 into the tub and onto the intermediate plate 140, the main PCBA including a portion which extends over the side space 31 and is adapted to support a memory module extending downwardly therefrom (step 508); electrically connecting the main PCBA 150 to the disk drive 130 (step 509); locating a module connector, electrically connected to the main PCBA 150, at a desired location at the tub's back wall 113 to provide for connection with a host connector when the ICM 100 is inserted into a host assembly (step 510); and finally depositing a ceiling wall 119 onto the tub 110 to define an enclosure that contains the lower shock mount, the disk drive, the upper shock mount, the intermediate plate, and the main PCBA (step 512).

In a final assembly process, one that is optional, the tub 110 and its interior components are encased in the sleeve 180 and the associated faceplate 181. As the faceplate 181 includes a handle 182 for carrying the entire ICM, it is important that the faceplate 181 have a secure, mechanical connection to the tub 110. The presently preferred construction for such a positive, mechanical connection comprises two pairs of backwardly-extending fingers 187 having inwardly extending detents (not shown), one pair on each side of the faceplate 181, and two corresponding pairs of slots 117 on the first and second side walls 114, 115 of the tub 110. As suggested by FIG. 4, the faceplate 181 is initially pressed onto the tub 110 until the detents on its fingers 187 engage the slots 117. Next, the tub 110 is inserted into the sleeve 180, the sleeve 180 thereby encasing the tub 110 and the fingers 187 so that they cannot splay outward and disengage from the slots 117. The sleeve 180 itself include an upper finger 185 and a lower finger (not shown), each having ramp-shaped projections that engage upper and lower ridges on the faceplate 181.

Referring once more to FIG. 4, the preferred shock mount system 120 comprises a lower shock mount and an upper shock mount that are preferably comprised, respectively, of four corner pieces 126 and four buttons 146 that are each formed from an elastomeric material, the preferred material being Sorbathane sold by Sorbathane, Inc. The corner pieces 126 each have a base and two intersecting, substantially perpendicular walls (not separately numbered) extending upwardly from the base (not separately numbered). During assembly, the corner pieces 126 are simply located with their bases on the floor wall 111 of the tub 110, and with their upstanding walls in the corners defined by the front wall 112, the back wall 113, the first side wall 114, and the intermediate wall 116. The upstanding walls of the corner pieces 126 are sized to provide a firm press fit relationship when compressed between the disk drive 130 and the surrounding walls 50, 113, 114, 116. The four button 146 are placed in wells (not shown) formed in the intermediate plate 140 to capture an opposite side of the disk drive 130 as described further below.

The presently preferred shock mounting system 120 requires us to orient the disk drive 130 with its controller board 131 facing upward, i.e. in a "board-up" orientation. The board-up orientation is preferred because it places the controller board 131 as close as possible to the main PCBA 150, thereby allowing a short cable with minimal signal degradation. A short cable is becoming increasingly important with higher data rates. In fact, given the ever increasing power of CPU's, it is now possible to control the disk drive via an ordinary expansion bus, such as the PCI bus, where a short cable may be critical. The board-up orientation is also preferred because the shock mounts 126 will not block access to the connectors 132 that are on the controller board 131. It is also desirable to mount the disk drive 130 board-up because the other side of the disk drive presents a clean, solid volume for contact with the shock mount system 120.

The disk drive 130, therefore, is oriented board side up and then pressed down onto and in between the four corner pieces. Next, the intermediate plate 140 is secured in the tub 110, between the first side wall 114 and an intermediate wall 116, to firmly hold the disk drive 130 downward on the corner pieces 126. The intermediate plate 140 is preferably secured with tabs on one side and snap-fit fingers on the other side, but the plate may be suitably secured with conventional threaded fasteners, or the like. Note that the controller board 131 is recessed into the disk drive's aluminum casting 132, leaving a pair of elongated casting rails 133 extending up above the board 131. The upper shock mounts (elastomeric buttons) 146 are preferably bonded to the intermediate plate 140, but they may be placed onto the casting rails in advance of securing the intermediate plate 140, without bonding, particularly if the upper shock mounts are provided in an alternative corner-shaped or L-shaped geometry that is unlikely to move during the assembly process. The buttons 146 press down against the elongated rails 133 of the casting 132. Consequently, the buttons 146 isolate the intermediate plate 140 from the rails 133, thereby enabling the shock mount system 120 to mechanically couple the disk drive 130 to the tub 110 via a shock-isolating, elastomeric interface.

The intermediate plate 140 also protects the disk drive's controller board 131 from electromagnetic interference (EMI) emanating from the main PCBA 150. The main PCBA 150 transmits significant amounts of RF energy over a wide frequency spectrum because it has synchronously clocked components that operate at relatively high power levels (e.g. greater than 5 watts) and at a plurality of relatively high clock frequencies (e.g. 66 MHz, 100 MHz, 500 MHz, and so on). The disk drive's controller PCBA 131, on the other hand, contains circuitry that operates at relatively low millivolt levels that are associated with reading and writing data to and from the disk drive 130. The intermediate plate 140, therefore, beneficially functions as an EMI shield in addition to securing the disk drive 130 in the tub 110. The preferred plate 140 is made of the same metallic material as the remainder of the tub 110 so that it represents an intermediate ground plane that tends to arrest conducted and radiated RF energy.

Figure 7:
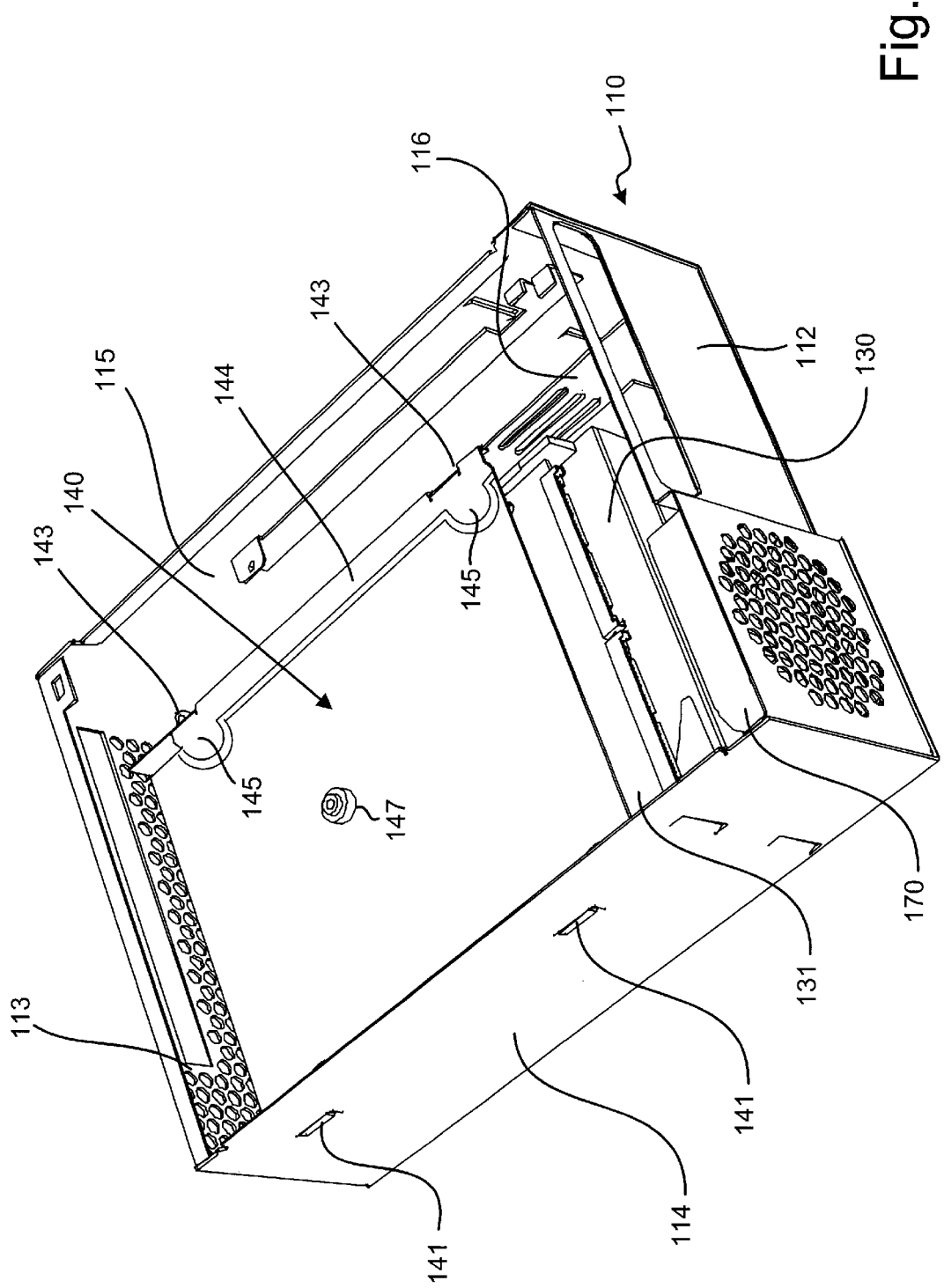
FIG. 7 shows a partially assembled integrated computer module with emphasis on the intermediate plate and its interconnection to the tub.

FIG. 7 shows the intermediate plate 140 and its interconnection to the tub 110 in more detail. As shown therein, the intermediate plate 140 has a central section, a front edge, a back edge opposite the front edge, a first side edge, and a second side edge opposite the first side edge. The preferred intermediate plate 140 has a pair of tabs 141 on its first side edge which interface with a corresponding pair of slots (not numbered) in the first side wall 114. The second side of the plate includes a pair of downwardly-extending fingers 143 that mate with one side of the intermediate wall 116 and an elongated lip 144 that mates with an opposite side of the intermediate wall 116. The downwardly-extending fingers 143 have detents (see FIG. 8) which mate with slots (not shown) in the intermediate wall 116.

Figure 8:
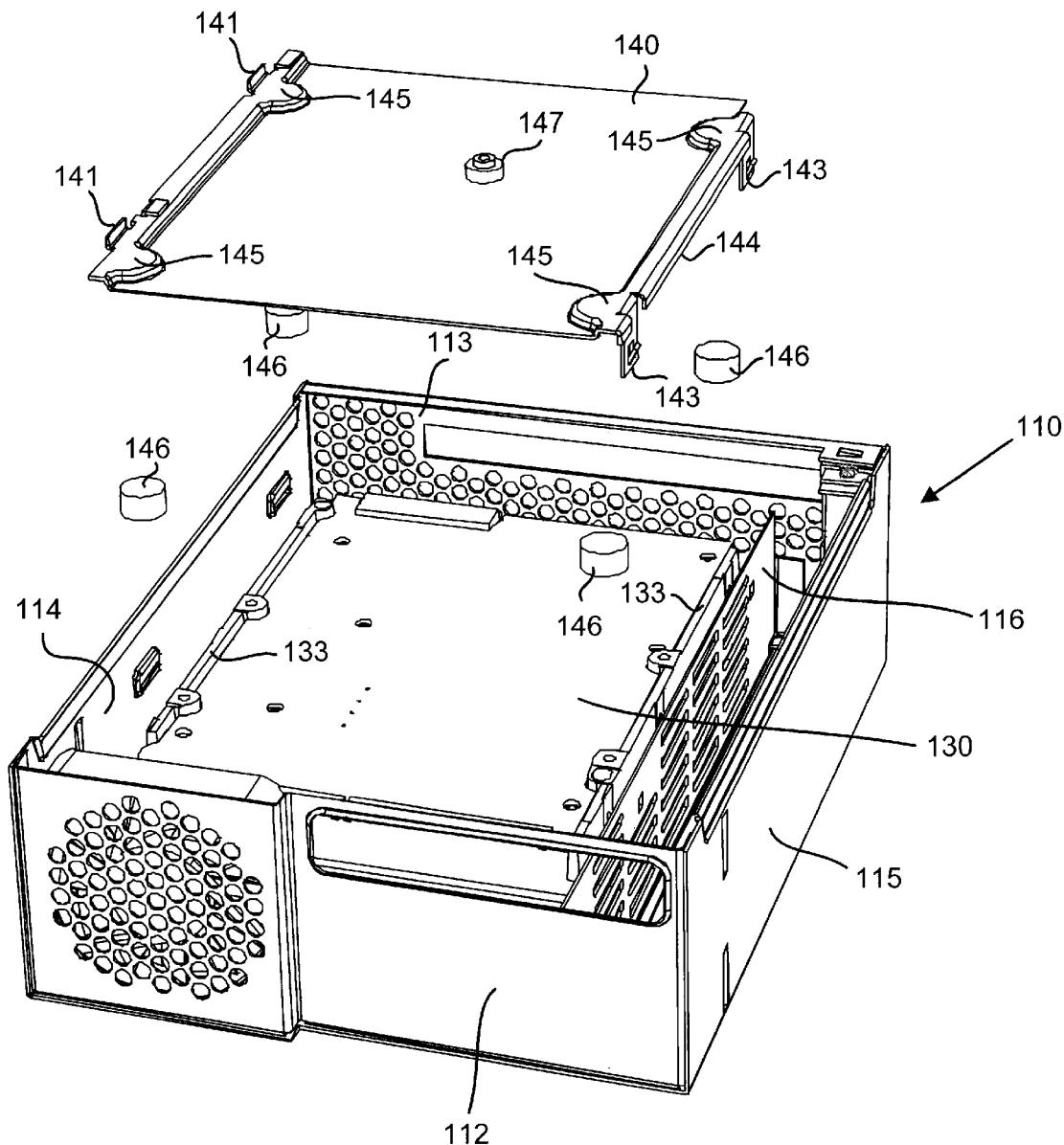
FIG. 8 is an exploded view of the integrated computer module of FIG. 7.

FIG. 8 is an exploded view of FIG. 7 showing the preferred interconnection between the intermediate plate 140 and the disk drive 130 in the tub 110. As shown, the intermediate plate 140 does not make direct contact with the disk drive 130. Instead, four upper shock mounts 146 are bonded or otherwise attached to corresponding wells 145 in the intermediate plate 140. The disk drive 130, therefore, is encased and elastomerically supported between the tub 110 and the intermediate plate 140 by the lower shock mounts 126 (see FIG. 4) and the upper shock mounts 146.

As best shown in FIG. 4, the main PCBA 150 is secured in the tub 110 above the intermediate plate 140. In the presently preferred embodiment, the main PCBA 150 is secured with two screws (not shown) that pass downward through two apertures—a central aperture 155 and a side aperture 159. The central screw mates with a threaded aperture in the top of a standoff (not shown) that has a threaded fastener that extends from its bottom and is screwed into a threaded boss 147 (see FIG. 8) in the center of the intermediate plate 140. The side screw mates with a threaded aperture in the top of a similar standoff (also not shown) that screws into a threaded aperture located at one end of a shelf bracket shown in FIG. 7 that is welded to the second side wall 115 of the tub 110. The other end of the preferred shelf bracket has outwardly extending, vertically spaced fingers (not shown) that surround the top and bottom of the main PCBA 150 and thereby secure it at a third location. It is important, of course, to ground the main PCBA 150. The preferred standoffs are conductive and make contact with corresponding traces that surround the main PCBA's central and side apertures to provide such grounding.

The main PCBA 150 may be divided into two upper portions and two lower portions. The upper left half of the main PCBA 150 carries the CPU and its heat sink 153. The upper right half carries a standard pair of PCM connectors 158 for interfacing the PCBA 150 with any PCM expansion card 160 that may be present. The majority left portion of the lower side of the main PCBA 150 rests closely against the intermediate plate 140 via support tabs 142 located to either side thereof and via a conductive standoff located near the plate's center (not shown). This portion of the PCBA's underside may carry some low-profile components, but it does not have any extending components due to its close proximity to the intermediate plate 140. The minority right portion of the main PCBA's underside, however, carries a pair of memory sockets 156 that support a pair of memory modules 157 which extend downwardly therefrom next to the disk drive 130, in-between the intermediate wall 116 and the second side wall 115. The ICM 100 may, of course, be provided with only one socket 156 and one memory module 157. An aperture (not shown) and associated cover plate 161 are provided on the tub's floor wall 111 and aligned with the memory modules 157 to provide access to the modules after the ICM 100 has been assembled.

The provision of highly efficient cooling is important because of the high power dissipation and component density in the relatively low volume of the ICM 100. Modern CPUs dissipate a significant amount of heat. For example, an Intel Pentium III processor operating at 500 MHz with a 512K L2 cache dissipates about 28 watts. The safe dissipation of this much heat requires a large, highly efficient heat sink 153, the preferred heat sink being fabricated from aluminum because aluminum offers a good compromise between heat dissipation and cost. The safe dissipation of this much heat also requires that cooling air pass over the heat sink's cooling fins (not numbered) at relatively high velocity, requiring at least 300 linear feet per minute (LFM). The air velocity at the heat sink is, of course, a function of the fan's volumetric output rate, the area of its exit aperture, and any leakage or airflow resistance that may be present. Chassis mounted cooling fans are available with airflow rates exceeding 200 cubic feet per minute (CFM). Given the advent of higher power CPU's and the endless variety of chassis designs, chassis mounted fans are sometimes supplemented by dedicated CPU fans. Dedicated CPU fans guarantee adequate air flow over the CPU. Because of their immediate proximity to the component to be cooled, they tend to have lower airflow rates of 5 to 15 CFM. Considering both of these fan variants as a group, the cooling fan used in the typical PC has an airflow rate from about 5 to 200 CFM. In either case, the larger, more powerful fans that provide the highest air volume are generally more costly and louder than their less capable counterparts.

Figure 9:
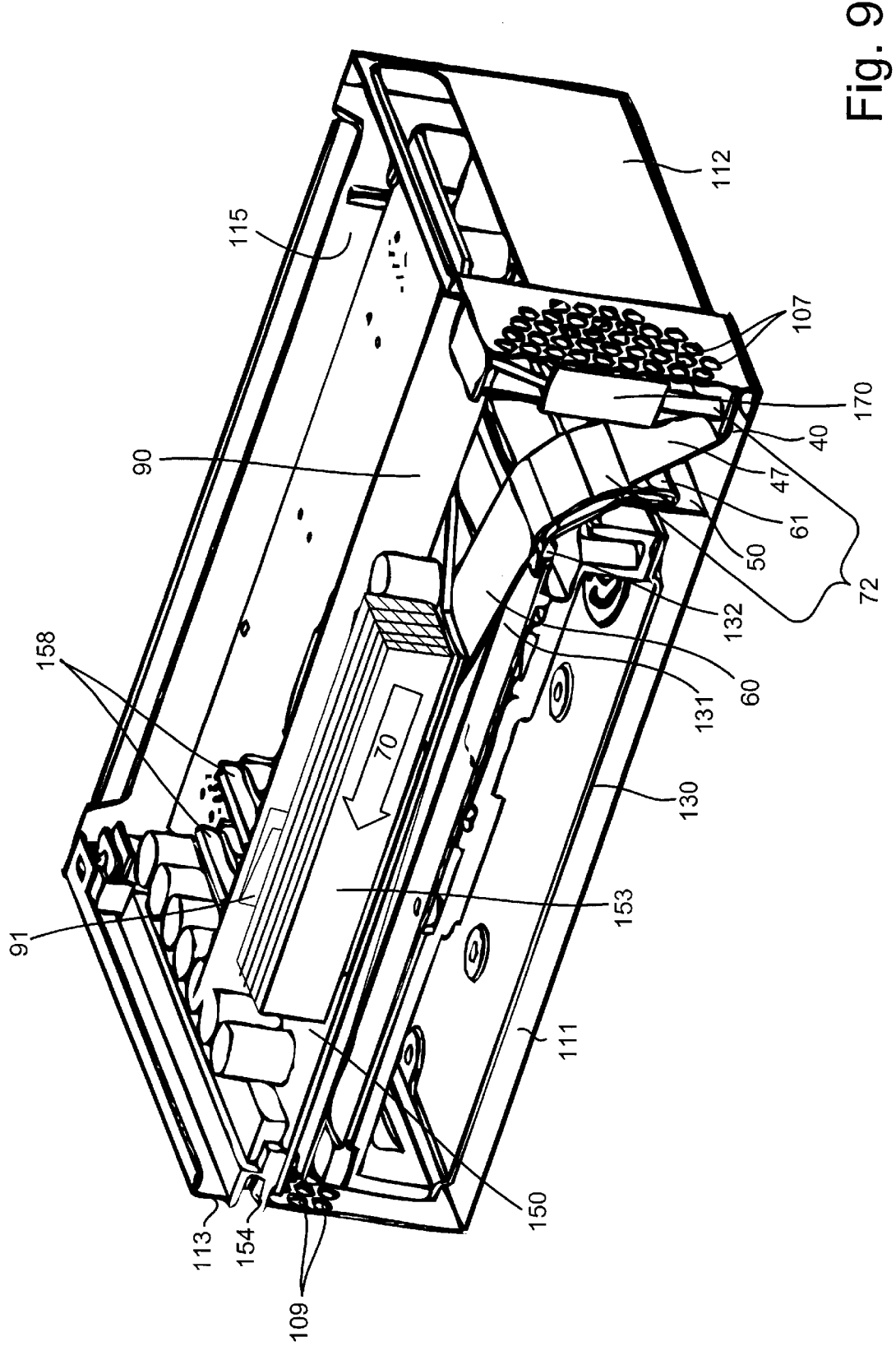
FIG. 9 is a cross-sectional view of the ICM of FIG. 1 (with the cover removed and the PCM card absent) showing a preferred cooling tunnel for efficiently cooling the ICM's microprocessor.
Figure 10:
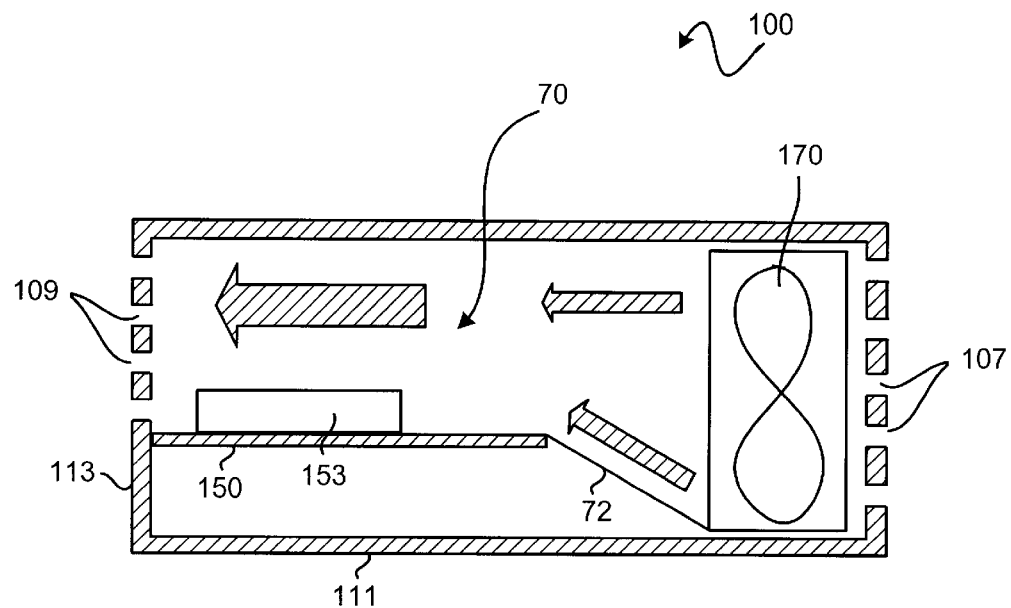
FIG. 10 is a simplified schematic view of the cooling tunnel of FIG. 9.
Figure 11:
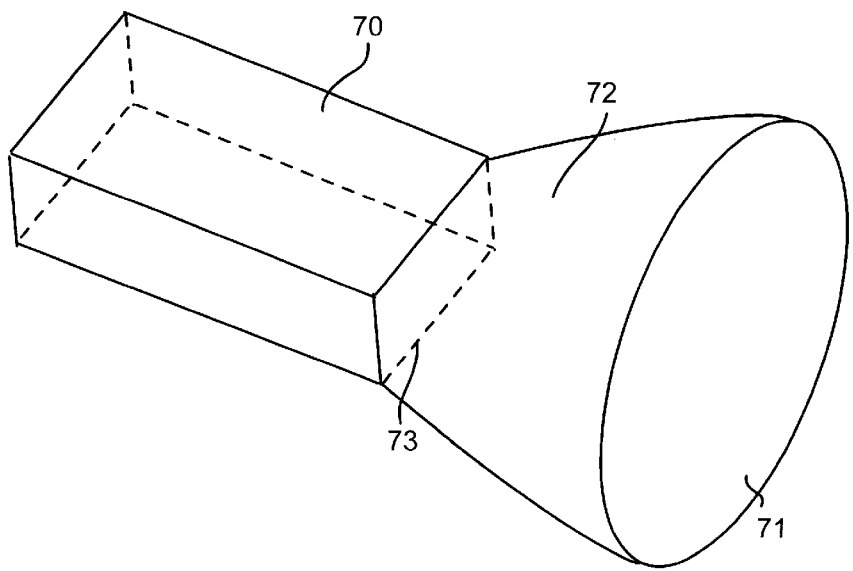
FIG. 11 is a further simplified view of the cooling tunnel of FIG. 9 with emphasis on the tapering section which accelerates cooling air into the tunnel.

If the cooling fans being considered for use push cooling air out an exit aperture with an area of about 6 square inches or about 0.04 square feet, and assuming a range of 5 to 50 CFM, the available cooling fans provides a corresponding linear velocity of 125 to 1,250 linear feet per minute (LFM) at the exit aperture. This is the measurement that translates to effective cooling of the heat sink 153. Given cost and noise considerations, one would choose the lowest possible rate fan that provides the desired linear velocity. FIGS. 9–11 relate to a unique cooling tunnel 70 and associated structure for accelerating cooling air within the cooling tunnel 70 to permit the ICM 100 to use a smaller, quieter, less costly fan than would otherwise be required as follows.

The ICM's built-in cooling fan 170 is preferably located next to the front wall 112 of the tub 110, next to the front cooling apertures 107, so that it has access to a continuous supply of relatively cool air. The fan 170, with the help of unique accelerating structure, moves air through the cooling tunnel 70, over the fins of the heat sink 153, with a velocity of greater than 300 linear feet per minute (LFM).

The preferred airflow structure is best shown in FIGS. 9, 10 and 11. As shown therein, the main PCBA 150 is designed so that the CPU's heat sink 153 extends upwardly into the "cooling tunnel" 70 located between the front and rear cooling apertures 107, 109 in the tub's front and back walls. The cooling fan 170 has an exit profile of a first area 71. The accelerating structure comprises a tapering means 72 for accelerating the air flowing from the fan's exit profile of first area 71 into the cooling tunnel 70 which has a tunnel profile of a second smaller area 73. The velocity of the cooling air is thereby accelerated within the tapering means 72 until it enters the cooling tunnel 70 at maximum velocity. The amount of acceleration is approximately determined by the ratio between the first and second areas 71, 73. The "approximate" qualifier is appropriate with respect to the preferred embodiment because the cooling tunnel 70 and the tapering means 72 are built from other components such that they are not completely airtight or completely smooth.

The cooling tunnel 70 could be an integral or discrete structure that is separable from other ICM components. As just mentioned, however, the preferred cooling tunnel 70 is formed from the physical arrangement of several existing components. A bottom of the tunnel 70 is defined by the upper surface of the main PCBA 150. A top of the tunnel 70 is defined by the ceiling wall 119. A first side of the tunnel 70 is defined by the tub's first sidewall 114. Finally, a second side of the tunnel 70 may be defined by a special partition member 90. In this fashion, the aforementioned components form a cooling tunnel 70 that axially surrounds the CPU's heat sink 153. The partition member 90 may have an optional diverter flap 91 which diverts some of the accelerated cooling air passing through the cooling tunnel 70 into other areas of the ICM 100.

The tapering means 72 can also take on a number of arrangements. The preferred tapering means 72, however, is an air ramp 72 which tapers upward from a bottom of the fan 170 toward the main PCBA 150 as shown in FIGS. 9 and 10. The air ramp 72 may be an integral member. In the preferred embodiment, however, the air ramp 72 comprises the flexible conductive assembly 60 (e.g. ribbon cable) which connects the main PCBA 150 to the disk drive 130. In more detail, a first end of the ribbon cable 60 is connected to the main PCBA 150 and a second end of the ribbon cable 60 is connected to the controller PCBA 131. Both connections are made adjacent the cooling fan's exit profile 71. The ribbon cable 60 is folded back between its first and second ends to form a folded portion 61 and the folded portion is held down near the cooling fan 170 such that an upper surface of the folded portion 61 extends downwardly from the main PCBA 150 toward a bottom of the cooling fan 170. The ribbon cable 60 is preferably held down by a hold-down ramp 47 which extends from the bottom of a fan bracket 40 welded into the tub 110. The hold-down ramp 47 does not have to extend from the fan bracket 40, but could instead extend from the tub 110 per se or extend from the front drive wall 50.

Figure 12:
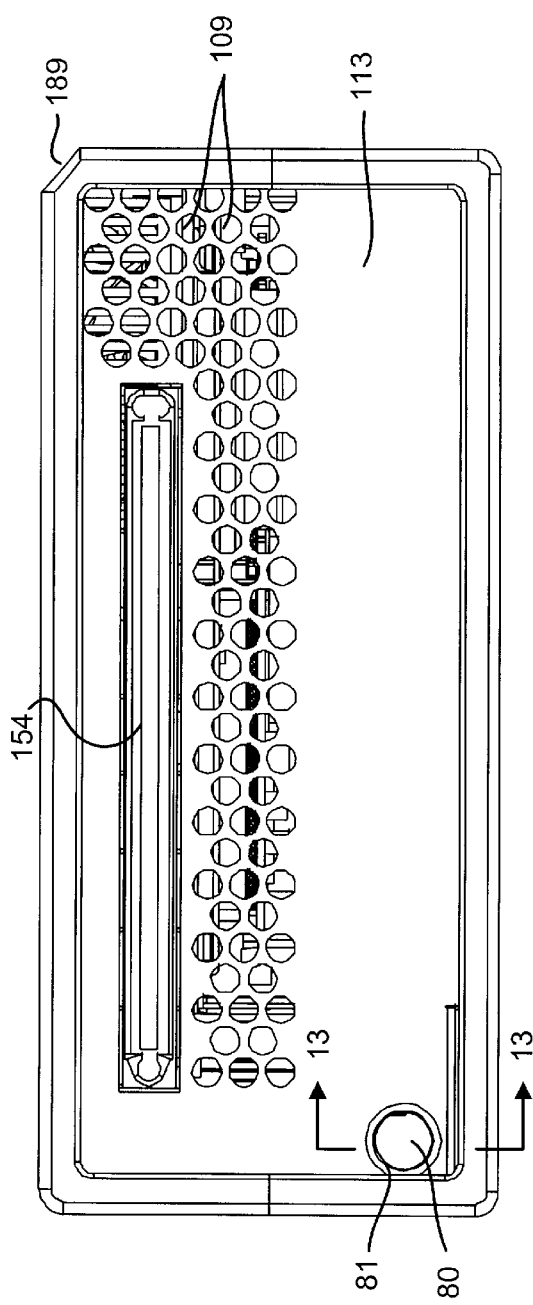
FIG. 12 is a rear view of the integrated computer module of FIG. 1.

FIG. 12 shows a rear view of a fully assembled ICM 100, the side that interfaces with a host assembly having a docking bay as described further below. As shown, substantially all of the back wall 113 is exposed at a rear end of the sleeve 180 to provide access to the module connector 154, the cooling apertures 109, and a module aperture 80.

Figure 13:
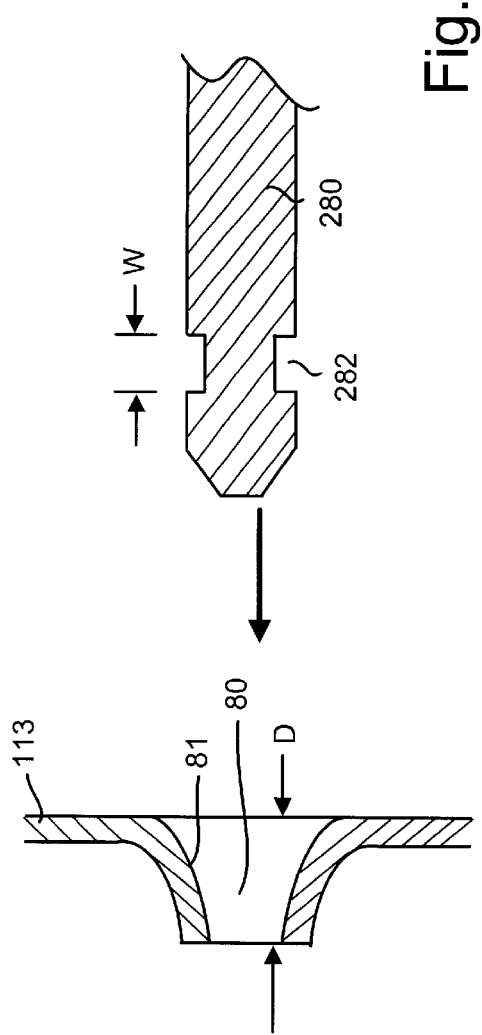
FIG. 13 is a section view of FIG. 12 taken along section lines 13—13.

FIG. 13 is a cross-sectional view of the preferred module aperture 80 in FIG. 12. In particular, FIG. 13 shows that the preferred module aperture 80 has radius edges 81 having a depth "D" that is greater than a width "W" of an annular groove 282 contained in a projecting member 280. We make "D" greater than "W" to ensure that the module aperture 80 does not accidentally hang up on the projecting member 280 as described more fully below in connection with the locking mechanism and the host assembly. The preferred module aperture 80 is formed by stamping or punching through the back wall 113.

A.2 System Architecture

Figure 14:
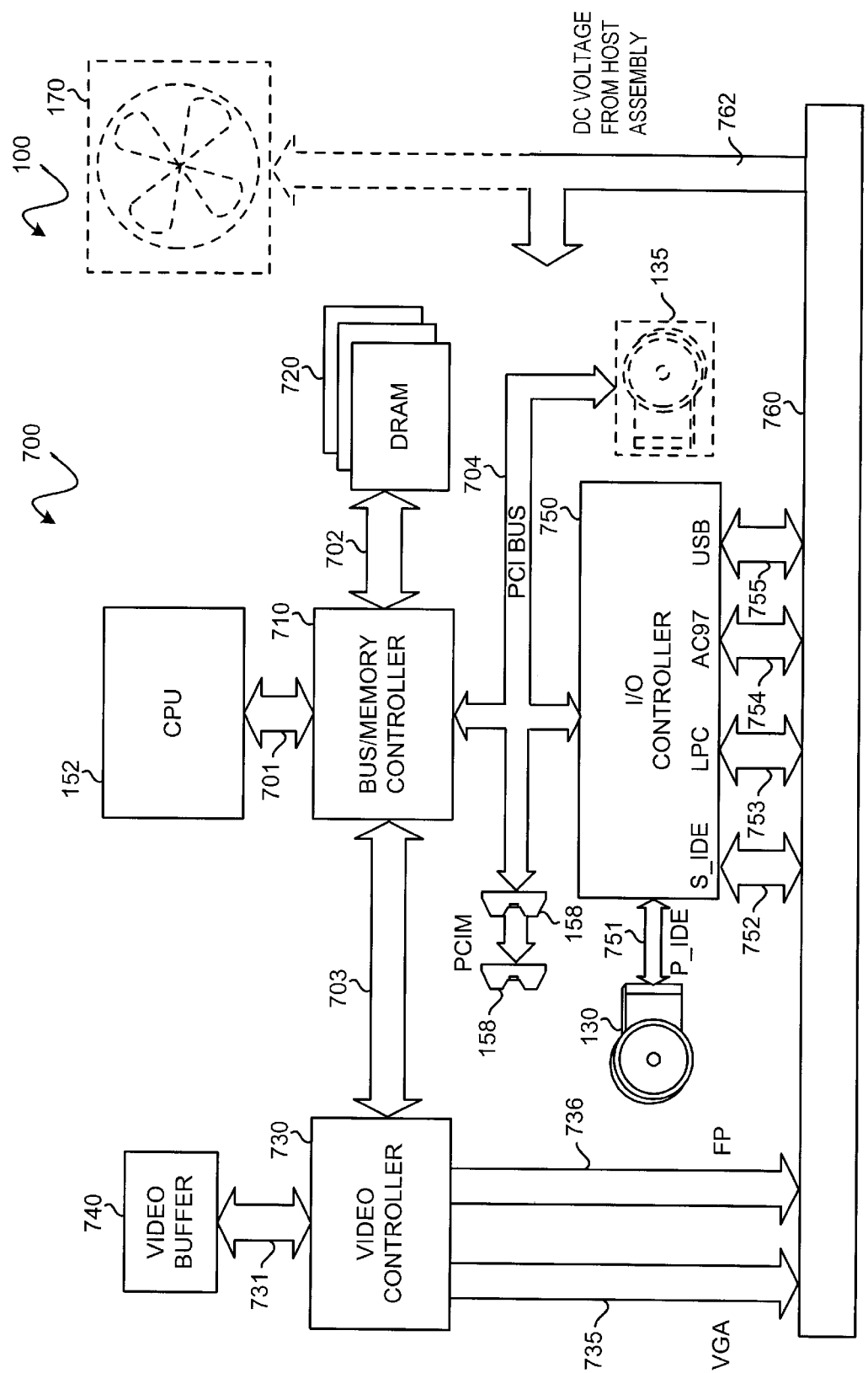
FIG. 14 is a block diagram of the system architecture of a computing subsystem used in an ICM according to this invention.

FIG. 14 is a block diagram of the preferred system architecture of a computing subsystem 700 in an ICM 100 according to this invention. As shown, a module connector means 760 interfaces the subsystem 700 with a host connector means in host assembly (not shown), thereby providing the ICM 100 and its optional cooling fan 170 with DC power and exchanging various signals over suitable I/O interfaces. These I/O interfaces are further discussed below. The module connector means 760 and associated host connector means (not shown) may comprise the module connector 154 and associated host connector 254 shown in FIG. 18, an edge connector and associated edge slot, or any other suitable connectors or collection of connectors.

As shown in FIG. 14, the computing subsystem 700 is operable solely when connected to the host assembly. The computing subsystem 700 is based around a central processing unit (CPU) 152 such as an Intel Pentium processor, a hard disk drive 130 for storing an operating system and application programs, a main memory array 720 for storing and executing the operating system and application programs, a video memory array 740 for storing digital display descriptor data, and a video controller 730 for converting the digital display descriptor data to a time-based display data stream suitable for driving a display. The video memory array 740 may be combined with the main memory array 720, or provided as a separate structure as shown.

The CPU 152 communicates with other system components at or near the CPU's internal clock speed via a processor bus 701 and a bus/memory controller 710. In addition to communicating directly with the CPU 152, the bus/memory controller 710 communicates with the main memory array 720 via a memory bus 702, with the video controller 730 via a video bus 703 (e.g. an Advanced Graphic Peripheral bus or AGP bus), and with an I/O controller 750 via a system expansion bus such as a PCI bus 704.

The bus/memory controller 710 and its associated buses 702, 703, 704 provide means for supporting the main memory array 720, means for transferring at least a portion of the operating system to the main memory array 720, means for coupling the microprocessor 152 to the main memory array 720 for executing the operating system, and means for storing digital display descriptor data in the video memory array 740. The structural and operational details of the bus/memory controller 710 and its associated buses 702, 703, 704 are omitted for the sake of brevity as they are well within the knowledge base of those of ordinary skill in this field.

As shown in FIG. 14, the PCI bus 704 further interfaces the CPU 152 with a standard pair of PCM connectors 158 for connecting to an optional PCM expansion card (not shown). The PCI bus 704 may later connect directly to a PCI-based disk drive 135, in lieu of or in addition to the IDE-based drive 130. The PCI-based disk drive 135 is not presently implemented, however, as suggested by the dashed lines.

The ICM 100 of FIG. 14 uniquely integrates four system-critical, computing subsystem components that are particularly prone to obsolescence, namely the CPU 152, the memory array 720, the disk drive 130, and the video controller 730 and its associated video memory array 740. The ICM 100 suitably houses these components in an EMI enclosure for containing emissions from the computing subsystem. Moreover, in order to receive power from and communicate with a host assembly, the ICM's module connector means 760 includes first conductors 735, 736 for coupling the video controller's time-based display data stream to an analog CRT display (VGA), a digital flat panel display (FP), or both, second conductors 762 for receiving the DC voltage from the DC voltage supply in the host assembly to power the computing subsystem, and third conductors 752, 753, 754, 755 for exchanging data with I/O devices, including "legacy" devices such as a keyboard, a mouse, a serial port device, a parallel port device. Finally, the preferred ICM 100 contains a fan 170 powered by the DC voltage received via the host connector means 760 for providing airflow to maintain the microprocessor 152 within specified thermal limits.

The I/O controller 750 interfaces the CPU 152 with various I/O devices over the third conductors 752, 753, 754, 755. The inventors presently contemplate an I/O controller 750 that implements an Integrated Drive Electronics (IDE) interface having a primary IDE channel P_IDE and a secondary IDE channel S_IDE, a Low Pin Count (LPC) interface according to Intel's LPC Interface Specification, an audio interface AC97 that operates according to Intel's Audio Codec '97 specification, and a Universal Serial Bus (USB) interface that operates according to the USB Specification, Rev. 1.0.

The selection of interface protocols for the third conductor set is particularly suitable for allowing the IPC to be interfaced to a wide variety of host assembly I/O device configurations, including those which may not be ordinarily considered "personal computer" variants. Such host assemblies include but are not limited to home and commercial control systems, communication systems, vending systems, entertainment systems, storage systems and financial terminals.

The topology of the IDE interface is also unique. In particular, the I/O controller 750 communicates with an IDE-based disk drive 130 contained inside of the ICM via the conductors 751 of the primary IDE channel P_IDE. The primary IDE channel P_IDE, therefore, remains inside of the module 100. The conductors 752 associated with the secondary IDE channel S_IDE, however, are connected to the module connector means 760 for exchanging data with an optional IDE peripheral that is contained in or attached to the host assembly (not shown).

B. The Host Assembly—Generally

Figure 15:
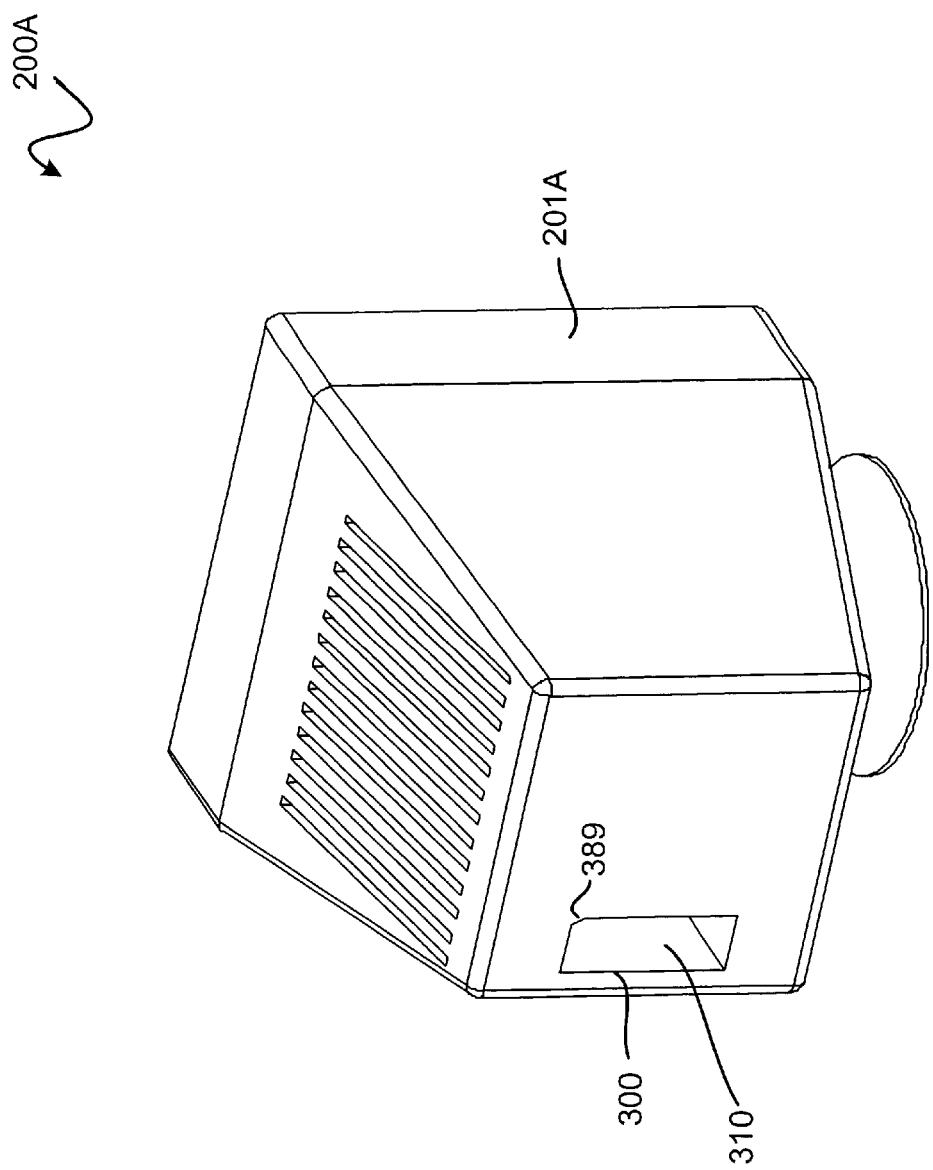
FIG. 15 is a rear perspective view of a host assembly that contains a CRT display and is configured to appear like a conventional CRT monitor.
Figure 16:
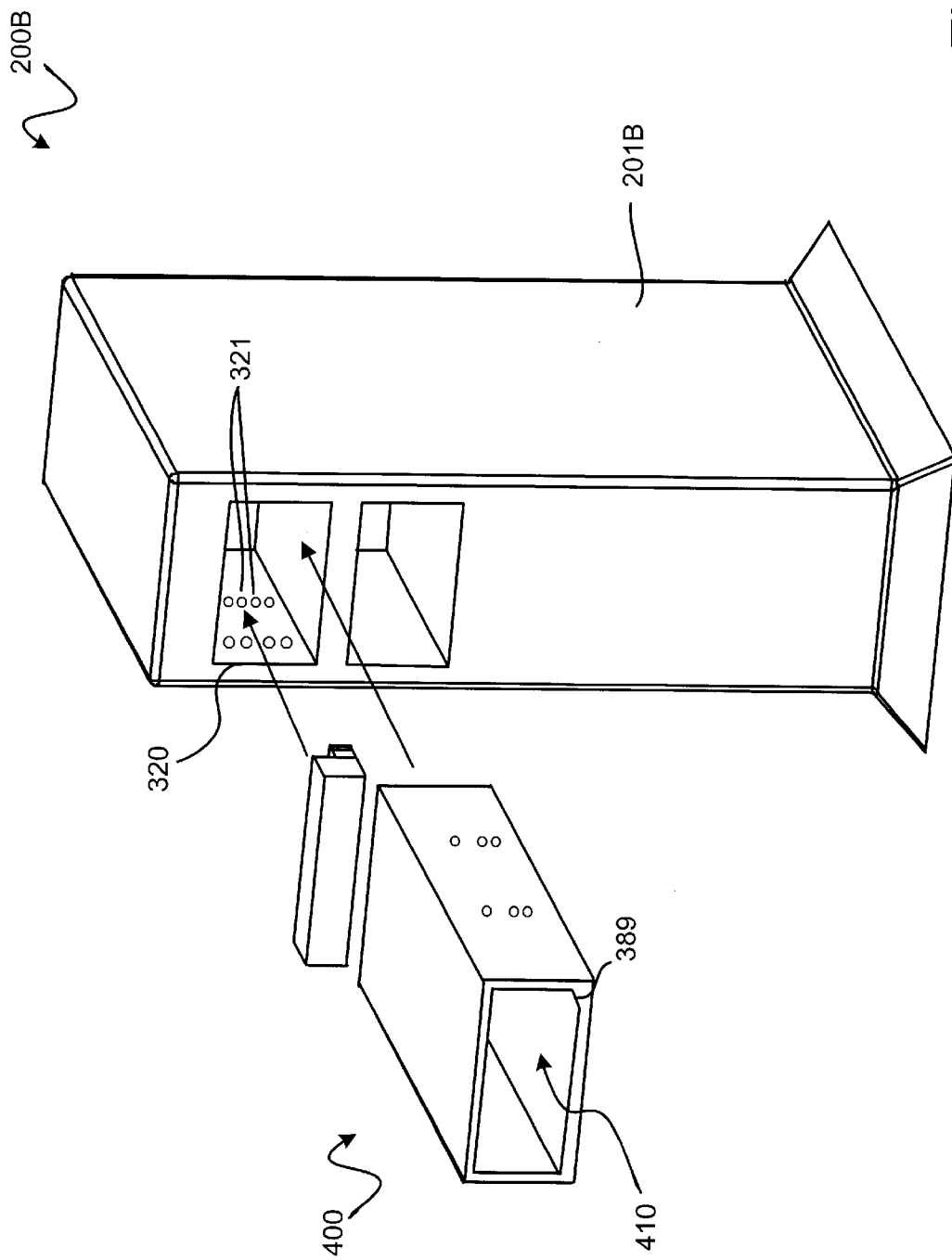
FIG. 16 is a front perspective view of a host assembly configured to appear like a conventional tower chassis that may be connected to a monitor, a keyboard, and a mouse (not shown)

FIGS. 15 and 16 show two host assemblies 200A, 200B. Both assemblies contain a power supply (not shown) for providing power to the host assembly and to the ICM 100 inserted therein. The first preferred host assembly 200A of FIG. 15 contains a CRT display and is configured to appear like a conventional CRT monitor 201 A. The second preferred host assembly 200B of FIG. 16 is configured to appear like a conventional full-height tower chassis 201 B that has a conventional disk drive bay 320 and may be connected to a display, a keyboard, and a mouse (not shown). Other configurations are possible. These two are merely illustrative examples.

The preferred host assembly provides a docking bay that defines a cavity for receiving an ICM 100. It is possible, however, to provide a docking module (not shown) that releasably connects an ICM 100 to other devices without providing a cavity 310 per se.

The FIG. 15 host assembly 200A uses a "built-in" docking bay 300 and associated cavity 310 having key feature 389 for mating with module key feature 189. In operation, the user inserts the ICM 100 of FIG. 1 into the cavity 310 until the ICM's module connector 154 (see FIG. 12) mates with a host connector 254 (shown in FIG. 17) at the rear of the cavity 310.

The FIG. 16 host assembly 200B, on the other hand, uses a "retrofit" docking bay adapter 400 that fits in a standard disk drive bay 320 and defines a cavity 410 having a host connector (not shown) and the key feature 389 for receiving an ICM 100. The cavity 410 in the retrofit adapter 400 also provides a host connector 254 (shown in FIG. 17) such that the user may insert the ICM 100 into the cavity 410.

C. The Host Assembly—Bay Details

Figure 17:
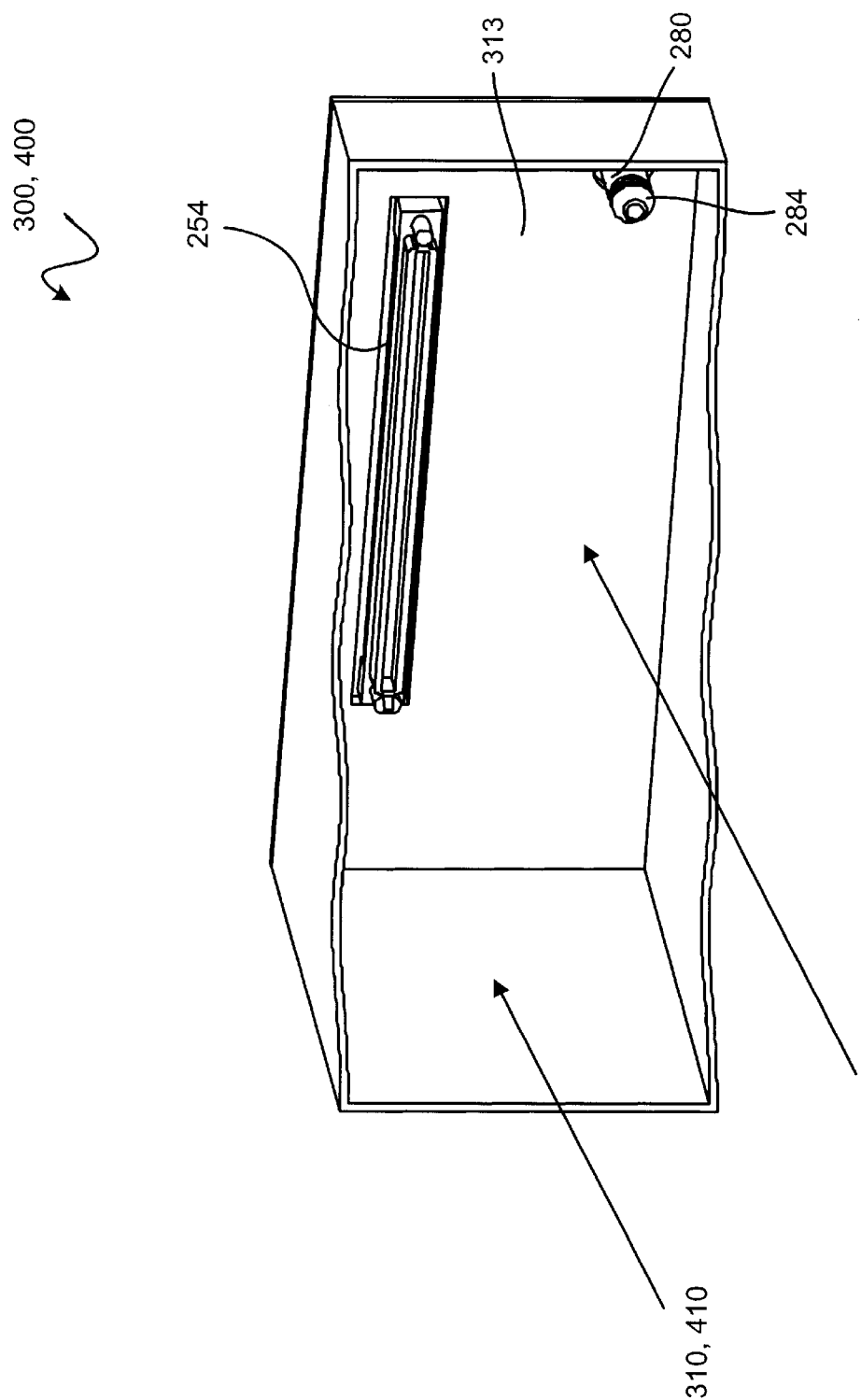
FIG. 17 is a generalized cutaway view of a docking bay according to this invention, suitable for use in a host assembly like those illustrated in FIGS. 15 and 16 and configured to receive, electrically mate with, and retain an integrated computer module like the one shown in FIG. 1.

FIG. 17 is a generalize cutaway view of a built-in docking bay 300 or retrofit adapter 400 according to this invention, the docking bay suitable for use in a host assembly 200A, 200B like those illustrated in FIGS. 15 and 16 and configured to receive, electrically mate with, and retain an ICM 100 like the one shown in FIG. 1.

The docking bay has a cavity 310 defined by a continuous periphery, preferably rectangular, extending from a front opening (not separately numbered) to a back end 313 opposite the front opening. The cavity 310 may be regarded as having an insertion axis (arrow) that is perpendicular to the periphery. Two items of interest are located at the back end 313 of the cavity 310: a host connector 254 for mating with the module connector 154 and a projecting member 280 for providing a data security function and an alignment function.

The host connector 254 is located a particular XY (horizontal and vertical coordinate reference) connector location at the back end 313 of the cavity 310 so that it mates with the ICM's module connector 154 located at the same XY connector location when the ICM 100 is inserted into the cavity 310. The host connector 254 may be centered on the back end 313 of the cavity, but the XY connector location is preferably asymmetric so that, in the absence of a key feature 189, mating only occurs if the ICM 100 is in the "correct" orientation.

The projecting member 280 extends into the cavity 310 in parallel with the insertion axis so that it may be received in a corresponding aperture 80 in the rear wall 113 of the ICM 100. The projecting member 280 may be located at an asymmetric XY location at the back end 313 of the cavity to prevent the user from fully inserting an unkeyed ICM 100 into the cavity 310 in the wrong orientation. In either case, the preferred projecting member 280 is located at the lower right corner of the cavity's back end 313 so that the ICM 100 may conveniently receive it near the ICM's second side 115 (see FIG. 4). Other locations are possible.

If the ICM 100 and docking bay 300, 400 are keyed, then the projecting member 280 will always mate with the aperture 80 in the rear wall 113 of the ICM 100. In this preferred embodiment, the projecting member 280 provides a guiding function and a locking function, but it does not impact the ICM 100 because misalignment is not possible.

In the case of an un-keyed ICM 100, however, alignment is not assured. If the un-keyed ICM 100 is inserted in the correct orientation where the connectors 154, 254 are aligned for mating, then the projecting member 280 is simply received by the module aperture 80 in the rear wall 113 of the ICM's tub 110 (see FIG. 4). If the un-keyed ICM 100 is inserted upside down, however, then a solid portion of the rear wall 113 will contact the projecting member 280 before the ICM's rear wall 113 contacts and potentially damages the host connector 254 and before the cavity's rear end 313 contacts and potentially damages the module connector 154.

Figure 18:
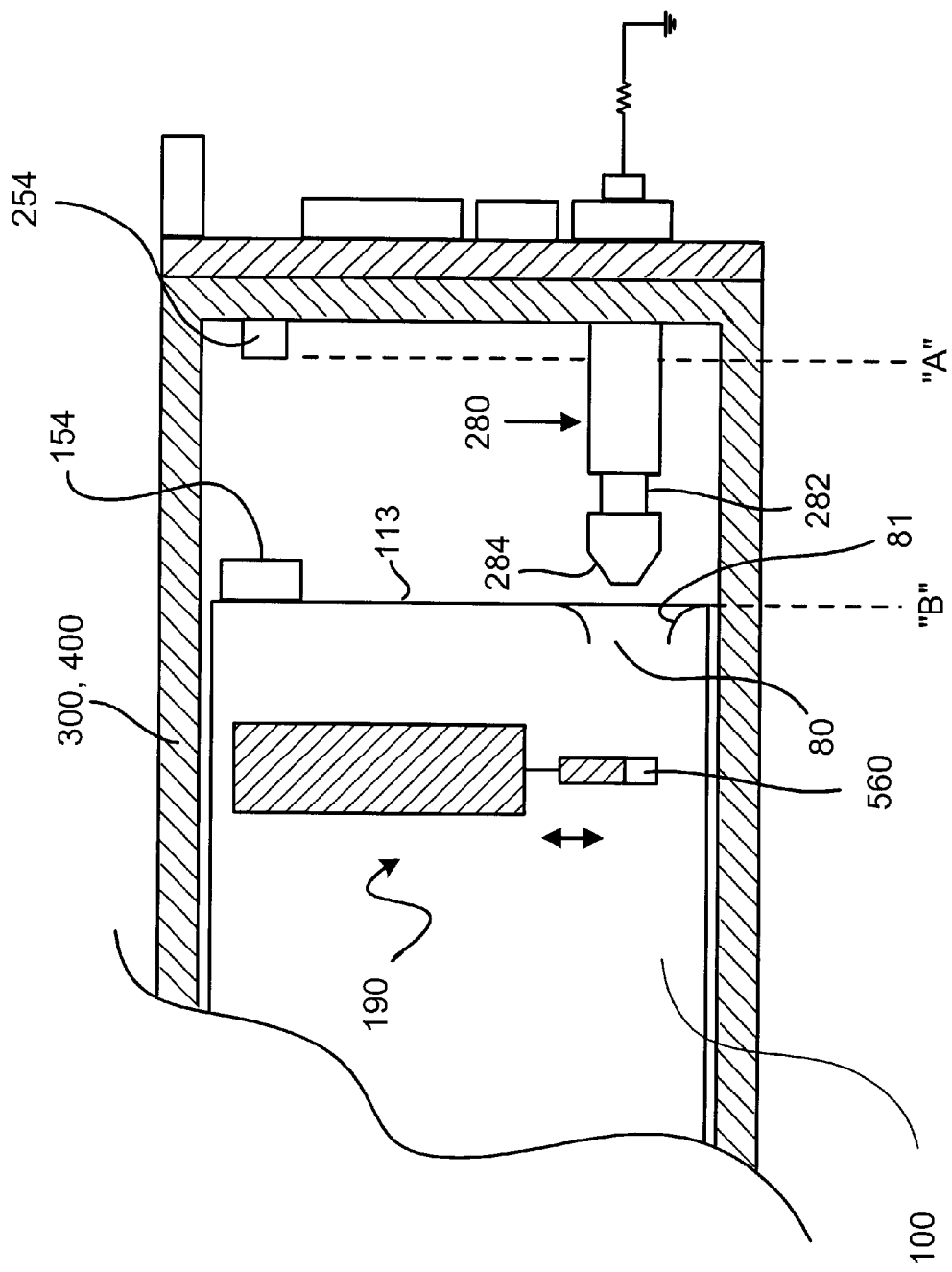
FIG. 18 is a cutaway plan view of the integrated computer module partially inserted into a host assembly to illustrate engagement with the projecting member.

FIG. 18 shows the ICM 100 partially inserted into the docking bay 300, 400. Note that the projecting member 280 extends beyond position "A," i.e. beyond the farthest most point of the host connector 254. This length ensures that the projecting member 280 contacts the ICM's rear wall 113 before the host connector 254 contacts the rear wall 113 if the ICM is inserted upside down.

The projecting member 280 also provides an alignment function that is best understood with reference to FIGS. 17 and 18. As shown, the preferred projecting member 280 has an annular taper at its tip 284 that slidably mates with the radius edge 81 of the module aperture 80. The radius edge 81 essentially defines an annular beveled recess that guides the module aperture 80 onto the projecting member 280, and thereby further aligns the overall ICM 100 for mating the module connector 154 to the host connector 254. The projecting member 280 must extend beyond position "A," however, if it also to provide such an alignment function in cooperation with the module aperture 80. As shown, in fact, the preferred projecting member 280 extends beyond reference position "A" to a farther reference position "B" to ensure that the module aperture 80 envelopes the projecting member 280 before the module connector 154 begins to mate with the host connector 254. A benefit of this additional length is that ICM 100 contacts the projecting member 280 well before the position that the ICM 100 ordinarily sits when mounted in the bay. Accordingly, the user is given very obvious feedback, both tactile and visual, that the ICM 100 is not corrected situated.

Suitably, the preferred connectors 154, 254 themselves include further complementary alignment features to ensure that a truly "blind" insertion is possible. A wide variety of cooperating connector styles may be used, including but not limited to, pin and socket types, card edge types, and spring contact types.

Although not shown, the inventors contemplate an alternative embodiment of the ICM 100 that is secured to a host assembly in a semi-permanent arrangement. For cost reasons, the semi-permanent embodiment would omit the sleeve 180 and associated faceplate 181 and would replace the blind mating connector 154 with a more cost effective PCBA edge connector having conductive fingers plated with minimal amounts of gold.

FIGS. 17 and 18 also show that the projecting member 280 provides a data integrity feature in connection with the locking mechanism 190 contained inside of the ICM 100. The projecting member 280, in particular, includes a retention notch 282 located on the side thereof. The preferred retention notch 282 is provided in the form of an annular groove 282 that encircles the entire projecting member 280 and the preferred locking mechanism 190 includes a latch plate 560 that locks the ICM 100 into the docking bay 300, 400 by engaging the projecting member's annular groove 292.

The preferred projecting member 280 is made of a conductive material and is grounded so that it may serve as a means for managing ESD. It is generally desirable to discharge electrostatic energy through a resistance to reduce the magnitude of an associated current spike. Accordingly, the projecting member 280 itself may be comprised of a moderately conductive material such as carbon impregnated plastic or the projecting member 280 may be made of a highly conductive material such as metal and connected to ground through a discharge resistor as shown in FIG. 18. In either case, the desired resistance is about 1–10 megohms.

FIGS. 19–22 show a presently preferred construction for a "retrofit" docking bay adapter 400 as might be used in the standard drive bay 230 in the host assembly 200B of FIG. 16. As shown, the retrofit adapter 400 comprises an adapter sleeve 420 and an adapter PCB 430 that is mounted to a back end of the adapter sleeve. The adapter sleeve 420 includes a suitable means for mounting to a standard drive bay 320 such as, for example, a plurality of threaded mounting holes 421 that are sized and spaced to interface with screws and corresponding through holes 321 (see FIG. 16) in a standard 5¼ drive bay 320. The preferred adapter sleeve 420 is formed of injection molded plastic. It includes a number of openings 425, therefore, to reduce the required amount of plastic material.

The adapter PCB 430, shown from the rear in FIG. 19 and from the side in FIG. 20, carries the host connector 254, the projecting member 280, and suitable circuitry 434 for interfacing the adapter PCB 430 to other components in the host adapter.

Figure 23:
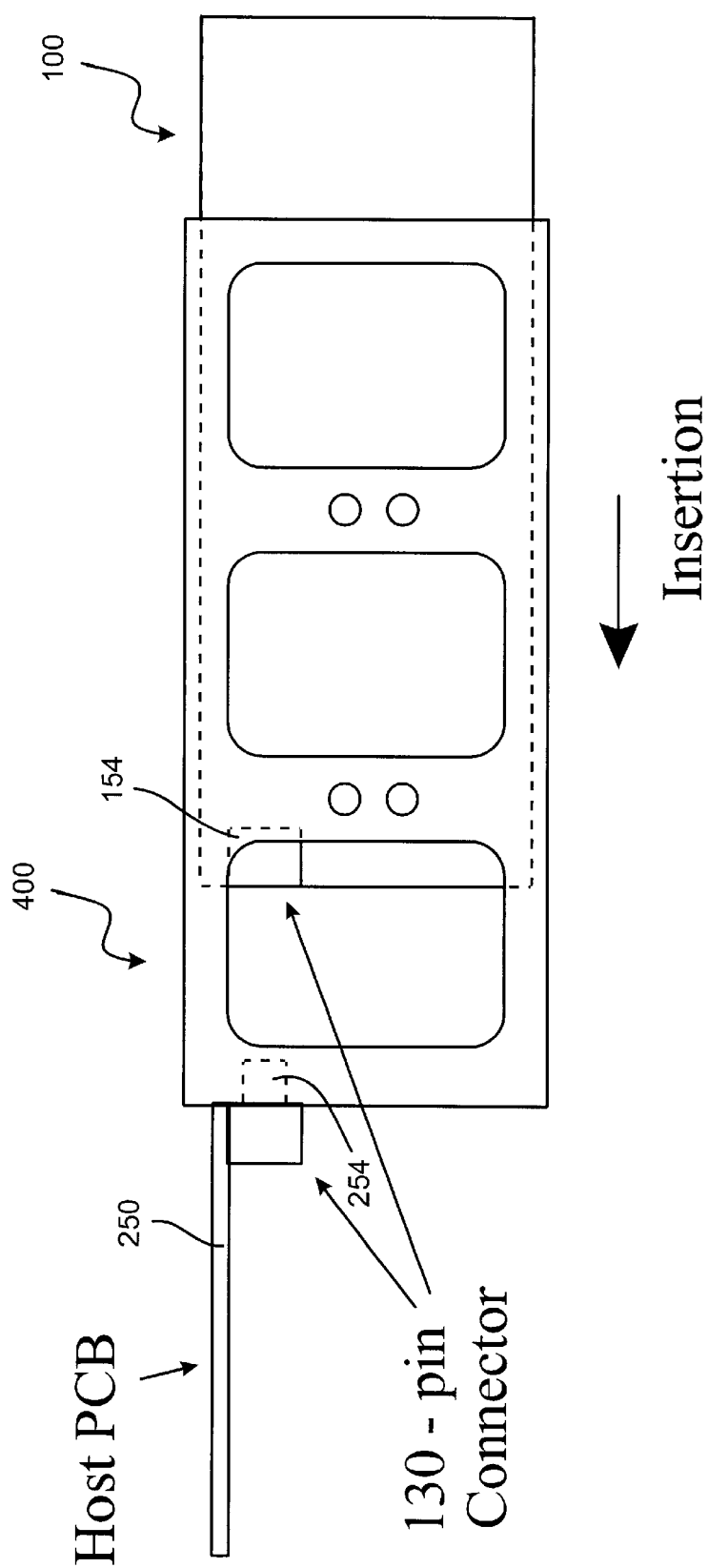
FIG. 23 is a side view of a preferred bay configuration (shown here in connection with an adapter sleeve) wherein the host connector is incorporated into the edge of a main host PCB.

FIG. 23 is a side view of a preferred structure for supporting the host connector 254. Here, instead of being supported on a separate PCB 430 as in FIGS. 19 and 20, the host connector 254 is incorporated into the edge of a main host PCB 250 in order to simply the construction and reduce costs. FIG. 23 shows such structure in connection with an adapter sleeve 400, but is probably more applicable for use with a "custom" built-in docking bay 300 as used in a host assembly 200A like that shown in FIG. 15, where more control can be exercised over the construction of the main host PCB 250 contained in the host assembly 200A.

D. The Locking Mechanism for Securing the ICM in the Host Assembly

FIGS. 2, 4 and 18 illustrate the preferred locking mechanism 190 to some degree. Having already discussed the ICM 100 and host assembly 200A, however, it is now possible to focus on the details of the locking mechanism 190 and its interface with the projecting member 280.

Figure 24:
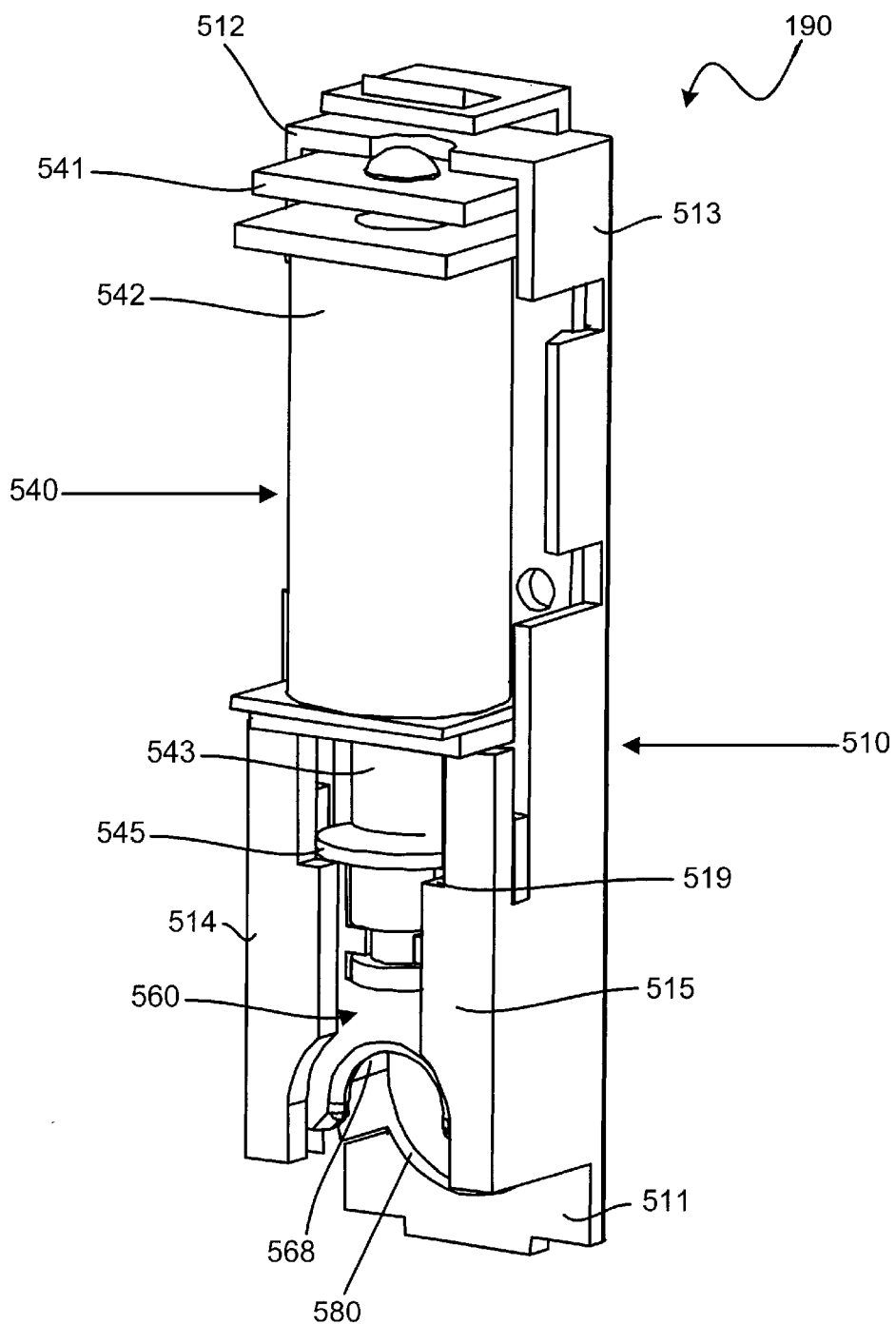
FIGS. 24 is a perspective view of the preferred locking mechanism.
Figure 25:
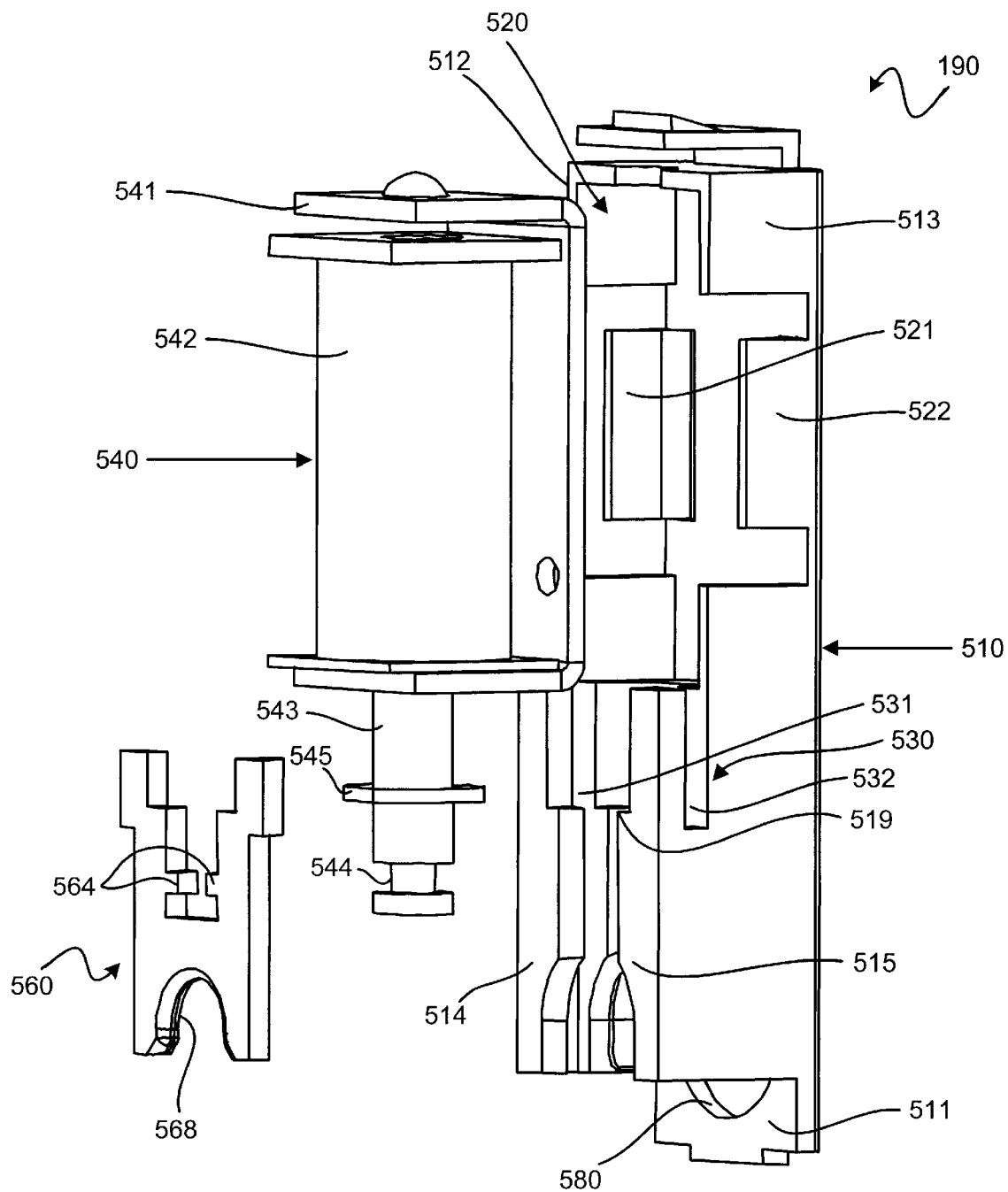
FIG. 25 is an exploded view of the locking mechanism of FIG. 24.

FIGS. 24 and 25 illustrate the construction of the preferred locking mechanism 190 in isolation. FIG. 24 show the locking mechanism 190 in a fully assembled state whereas FIG. 25 shows it in an exploded state. As shown in both figures, the locking mechanism 190 generally comprises a latch body 510, a solenoid 540 with a frame 541, a coil 542, a plunger 543, and a latch plate 560. The latch body 510 includes a back wall 511, a first side wall 512 extending from the back wall 511, a second side wall 513 extending from an opposite side of the back wall 511, and a pair of inwardly extending front walls 514, 515. The latch body's various walls 511, 512, 513, 514, 515 are configured to define an upper solenoid chamber 520 and a lower latch plate chamber 530. In particular, the upper solenoid chamber 520 includes a pair of spaced-apart gripping members 521, 522 that engage the solenoid's frame 541 and the lower latch plate chamber 530 includes first and second grooves 531, 532 that slidably receive the latch plate 560. FIGS. 24 and 25 also show the connection between the solenoid plunger 543 and the latch plate 560. As best shown in FIG. 25, the latch plate 560 has retention tabs 564 that engage a retention groove 544 in the plunger 543. The plunger 543 is biased downward by an internal spring (not shown) or the like. Accordingly, the plunger 543 includes a stop ring 545 that ultimately rests on stop shoulder 519 to limit the plunger's downward travel.

Figures 26, 27:
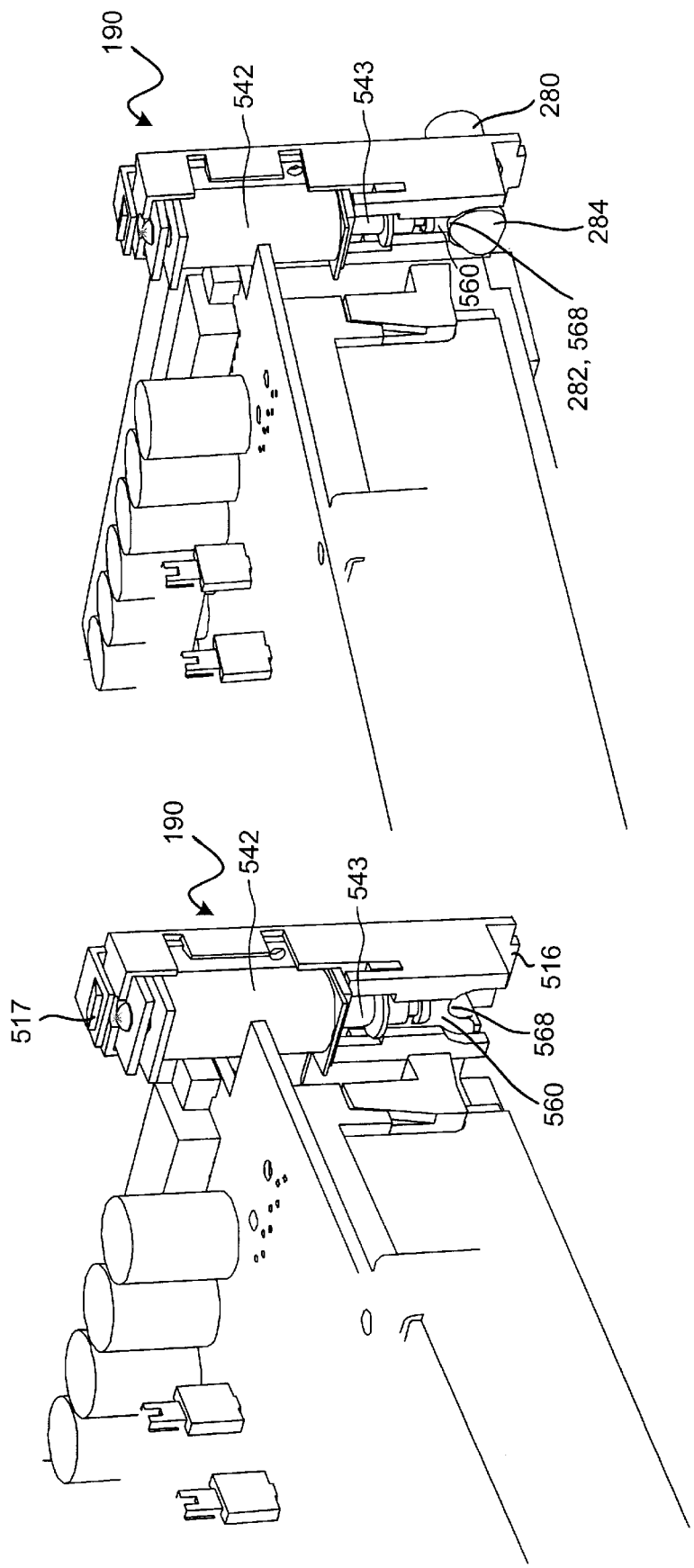
FIG. 26 is a partial cutaway view of the locking mechanism of FIG. 24 as situated in an ICM.
FIG. 27 is a partial cutaway view of the locking mechanism of FIG. 24 after having engaged a projecting member extending from the back of the docking bay.

FIGS. 26 and 27 are partial cutaway views that show the latch mechanism 190 in its ultimate location near the back wall of the ICM 100. As suggested by such figures, the locking mechanism 190 includes a lower tab 516 and an upper projection 517 which, as shown in FIGS. 2 and 4, provide a snap-in connection at a back corner of the tub 110 via an upper slot 118 and a lower slot (not shown).

FIG. 18, discussed earlier, shows the ICM 100 partially inserted into the docking bay 300. FIG. 21 shows the locking mechanism 190 before it has received the projecting member 280 and FIG. 27 shows the same mechanism 190 after it has received the projecting member 280. In operation, when the ICM 100 is inserted into the docking bay 300, the tip 284 of the projecting member 280 extends through the module aperture 80 in the back wall 113 of the tub 110 (shown in FIGS. 12, 13 and 18), through an aligned aperture 580 in the back wall 511 of the latch body 510, and presses upwardly against a notch 568 in the latch plate 560. The latch plate 560 ultimately moves upward until the projecting member's annular groove 282 is beneath notch 568 in the latch plate 560, at which point the latch plate 560 moves downward such that its notch 568 securely engages the projecting member's annular groove 282 as shown in FIG. 27. The ICM 100, therefore, is mechanically retained in the docking bay 300 until the solenoid 542 is energized to pull up the plunger 543 and associated latch plate 560 and thereby release the projecting member 280.

Figure 28:
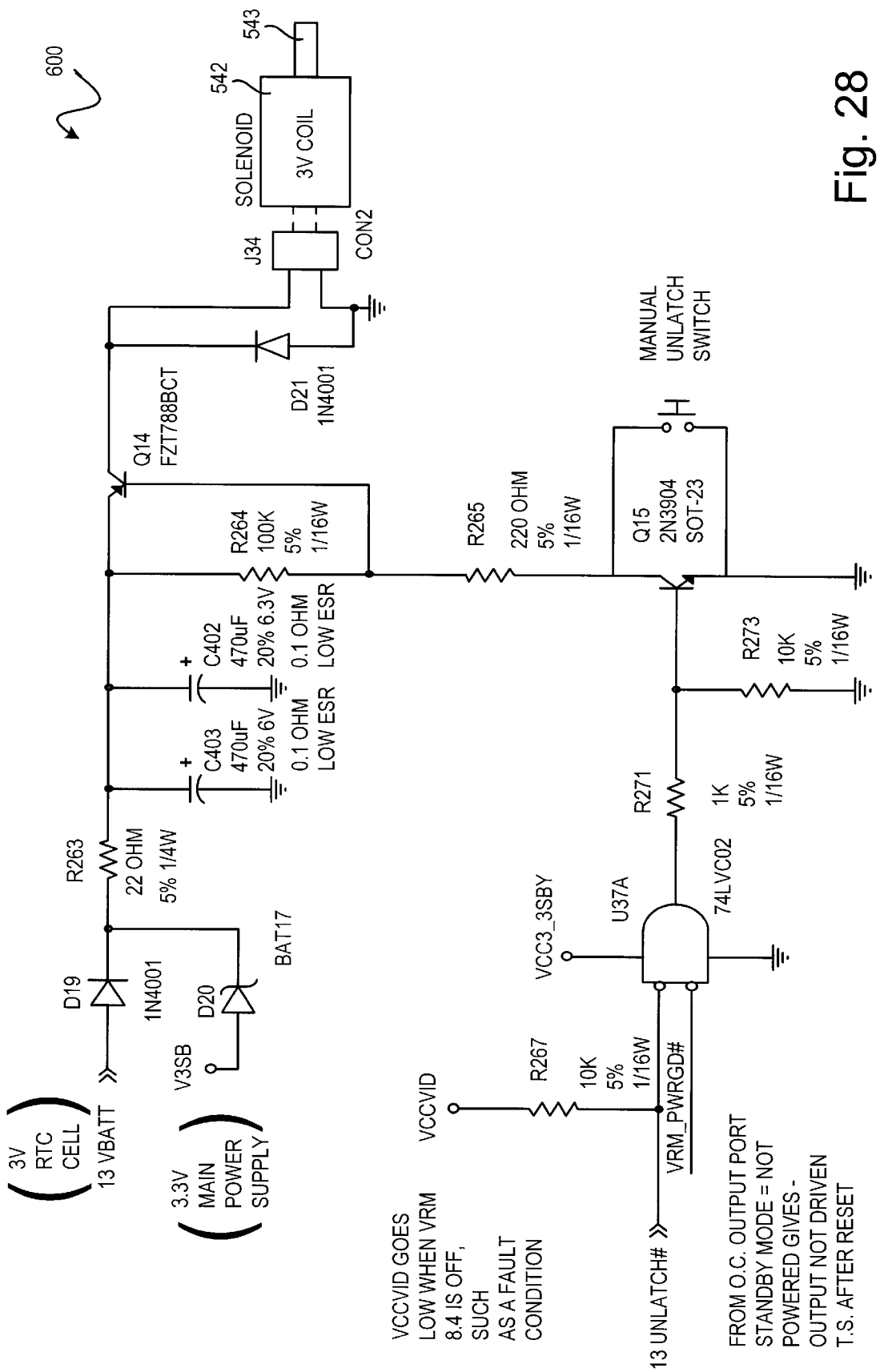
FIG. 28 is a schematic of a preferred control circuit for operating the locking mechanism of FIG. 24.

FIG. 28 is a schematic of a preferred control circuit 600 for the locking mechanism 190. The circuit 600 is designed so that the solenoid 542 may be programmatically energized through transistor Q14 or manually energized through switch SW1 on an "emergency" basis in the absence of power from the host assembly. In the presence of host assembly power, the solenoid 542 will be energized only if UNLATCH# and PWR_GD# are both asserted (low). The UNLATCH# signal is software controlled such that it is programmatically asserted only when the probability of a false assertion is remote (i.e. power is on and is good) and when it is safe to do so (e.g. in the absence of a writing operation.) The UNLATCH# signal is provided on an open-collector port in the preferred embodiment. Accordingly, the input to the AND gate U37A is pulled high through a resistor R267 so that the input is forced high during the time that the UNLATCH# signal is not asserted. In the event the PWR_GD# signal is present (low) and appropriate software asserts the UNLATCH# signal (low), then the output of AND gate U37A goes high and transistor Q15 is turned "on" via the voltage applied to its base across the divider network of resistors R271 and R273. With transistor Q15 on, the always-on "standby" voltage from the main power supply provided at V3SB (3.3 volts) is provided to the base of transistor Q14 through bias resistors R264 and R265, whereupon current may flow through transistor Q14 and through the solenoid 542 to ground.

The current comes in two levels, an "activation" current and a "holding" current. In this regard, note that the circuit 600 includes a pair of relatively large, low-leakage capacitors C402, C403 which are charged to capacity during normal operation by the main power supply V3SB through a current limiting resistor R263. When transistor Q14 is turned on, the "activation" current needed to actuate the solenoid 542 is provided by the rapid discharge of the capacitors C402, C403. Next, after the capacitors have discharged, the "holding" current needed to keep the solenoid energized is provided by the lower current flowing from V3SB, through the current limiting resistor R263.

In the absence of good power, PWR_GD# would not be present and the UNLATCH# signal cannot energize the solenoid 542. The capacitors C402, C402 in the circuit 600, however, offer a unique method to provide for an "emergency" removal of the ICM 100. In the absence of power, the minimal amount of current needed to maintain the charge on the capacitors C402, C403 is provided by VBATT (3 volts). This is the "clock battery," i.e. the 3V Lithium cell used to maintain the real-time clock (RTC) when the ICM is not connected to a source of power.

For emergency removal, a manual unlatch switch SW1 is provided on the ICM 100, "across" or in parallel with transistor Q15, and made available to the user. The manual switch SW! should be somewhat difficult to operate. For example, the manual unlatch switch SW1 might be closed only by inserting a paper clip or other small object through a hole in the front of the ICM 100. When the manual unlatch switch SW1 is closed, transistor Q14 is turned on as before, and the "activation" current needed to open the latch is provided by rapid releasing the energy stored in the capacitors C402, C403 through the solenoid 542. Under these "emergency conditions" however, the "holding" current needed to keep the solenoid 542 open is provided by VBATT (rather than V3SB) to give the user a brief, but sufficient opportunity to remove the ICM 100.

We claim:

1. An integrated computer module (ICM) for connection to a host connector means in a host assembly, the host assembly containing a DC power supply with DC voltage therefrom coupled to the host connector means, the host assembly connected to or containing a display, the ICM comprising:
a computing subsystem operable solely when connected to the host assembly, the computing subsystem further comprising:
a microprocessor;
a hard disk drive for storing an operating system;
means for supporting a main memory array;
means for transferring at least a portion of the operating system to the main memory array;
means for coupling the microprocessor to the main memory array for executing the operating system;
means for storing digital display descriptor data in a video memory array; and
a video controller for converting the digital display descriptor data to a time-based display data stream suitable for driving the display;
module connector means for connecting to the host connector means, the module connector including
first conductors for coupling the time-based display data stream to the display via the host connector means;
second conductors for receiving the DC voltage from the DC voltage supply in the host assembly via the host connector means to power the computing subsystem; and
third conductors for exchanging data with an I/O device via the host connector means,
an EMI enclosure for containing emissions from the computing subsystem; and
a cooling subsystem including a fan powered by the DC voltage received via the host connector means for providing sufficient airflow to maintain the microprocessor within specified thermal limits.

2. The ICM of claim 1 wherein the module connector means comprises one connector and wherein the first, second and third conductors are contained in the one connector.

3. The ICM of claim 1 wherein the main memory array and the video memory array are the same.

4. The ICM of claim 1 wherein the main memory array and the video memory array are separate.

5. The ICM of claim 1 wherein the I/O device is one of a keyboard, a mouse, a serial port, and a parallel port.

6. The ICM of claim 1 wherein the computing subsystem further comprises an IDE controller that provides a primary IDE channel and a secondary IDE channel.

7. The ICM of claim 6 wherein the disk drive is an IDE drive and wherein the IDE drive is connected to the primary IDE channel.

8. The ICM of claim 6 wherein the primary IDE channel remains inside of the ICM and wherein the module connector means further comprises fourth conductors corresponding to the secondary IDE channel for exchanging data with an IDE peripheral contained in or attached to the host assembly via the host connector means.

9. The ICM of claim 1 wherein the EMI enclosure substantially independently contains emissions from the computing subsystem.

10. The ICM of claim 9 wherein the ICM is substantially exposed when connected to the host connector means in a host assembly.

11. The ICM of claim 9 wherein the ICM is received in a docking bay in the host assembly.

12. The ICM of claim 1 wherein the EMI enclosure relies at least in part on the host assembly to contain emissions from the computing subsystem.

13. The ICM of claim 12 wherein the ICM is received in a docking bay in the host assembly.

* * * * *